(12) United States Patent
Paoluccio et al.

(10) Patent No.: US 11,191,260 B2
(45) Date of Patent: Dec. 7, 2021

(54) AQUATIC ORGANISM TREATMENT METHOD AND APPARATUS

(71) Applicants: John J Paoluccio, Modesto, CA (US); John A Paoluccio, Modesto, CA (US)

(72) Inventors: John J Paoluccio, Modesto, CA (US); John A Paoluccio, Modesto, CA (US)

( * ) Notice: Subject to any disclaimer, the term of this patent is extended or adjusted under 35 U.S.C. 154(b) by 142 days.

(21) Appl. No.: 16/353,852

(22) Filed: Mar. 14, 2019

(65) Prior Publication Data

US 2019/0208763 A1    Jul. 11, 2019

Related U.S. Application Data

(63) Continuation of application No. 15/975,350, filed on May 9, 2018, now abandoned, which is a continuation-in-part of application No. 15/358,067, filed on Nov. 21, 2016, now Pat. No. 10,123,525.

(51) Int. Cl.
    *A01M 21/04*      (2006.01)
    *A01M 1/22*      (2006.01)
    *A01M 21/00*      (2006.01)

(52) U.S. Cl.
    CPC ............ *A01M 21/04* (2013.01); *A01M 1/226* (2013.01); *A01M 21/043* (2013.01); *A01M 21/00* (2013.01)

(58) Field of Classification Search
    CPC ................................ A01M 1/04; A01M 1/226
    See application file for complete search history.

(56) References Cited

U.S. PATENT DOCUMENTS

| | | | | |
|---|---|---|---|---|
| 5,594,422 A * | 1/1997 | Huey, Jr. | ............... | G08B 17/10 340/539.1 |
| 5,607,711 A * | 3/1997 | Lagunas-Solar | ...... | A01M 1/226 426/248 |
| 2011/0180423 A1* | 7/2011 | Barry | .................... | A01K 63/04 205/742 |
| 2014/0165452 A1* | 6/2014 | Rocha | .................... | A01M 1/08 43/113 |
| 2014/0224648 A1* | 8/2014 | Andrews | ............... | C02F 1/4672 204/252 |
| 2017/0156304 A1* | 6/2017 | Hori | ...................... | A01M 1/226 |
| 2017/0203986 A1* | 7/2017 | Ervin | ........................ | C02F 9/00 |
| 2018/0343847 A1* | 12/2018 | Ervin | .................... | A01M 1/226 |

\* cited by examiner

*Primary Examiner* — Christopher D Hutchens
(74) *Attorney, Agent, or Firm* — Robert S. Smith

(57) ABSTRACT

An apparatus and the associated method which includes means for controlling an invasive organism. The means including a trolling apparatus, for attachment to an associated vehicle. The trolling apparatus is pulled through a body of water in response to movement of the associated vehicle. The housing carries a plurality of UV-C light sources for producing UV-C light at a wavelength of substantially 254 nm, whereby invasive organisms proximate to light emanating from at least one of said UV-C light source whereby invasive organisms are exposed to UV-C light at a wavelength of substantially 254 nm resulting in controlling an invasive organism. Other embodiments, attract organisms such as mosquitos and then expose them to UV-C light. The invention facilitates reduced use of herbicide.

22 Claims, 16 Drawing Sheets

AQUATIC ORGANISM TREATMENT METHOD AND APPARATUS

CROSS-REFERENCE TO RELATED APPLICATIONS

This application is a continuation of U.S. patent application Ser. No. 15/975,350 filed on May 5, 2018 which was a continuation in part of U.S. patent application Ser. No. 15/358,067 filed on Nov. 21, 2016 which matured into U.S. Pat. No. 10,123,525 issued on Nov. 13, 2017. This application contains subject matter which is related to U.S. Pat. No. 9,622,465 dated Apr. 18, 2017 which matured from U.S. patent application Ser. No. 15/184,367 filed on Jun. 16, 2016 entitled Short-Wavelength Ultraviolet Light Array for Aquatic Invasive Weed Species Control Apparatus and Method having the same inventive entity and ownership. Each such application and/or patent is hereby incorporated herein by reference in its entirety.

TECHNICAL FIELD

The present invention is generally directed to remediation of invasive aquatic organisms. The term "Aquatic" as used herein means relating to water and/or living in or near water or taking place in water.

The term "organism" as used herein means any individual living thing including but not limited to plants, animals, bacterium, microbes, fungus, mussels, mussel larval, mosquitos, mosquito eggs, larvae and pupae, insects, microorganisms, species and other living organisms. An organism has a body made up of smaller parts that work together. There are many different organisms. It is estimated are there to be as many as 100,000 different organisms on Earth. Sometimes organisms are grouped by the environment they live in. For example, aquatic organisms live in or near a body of water.

The term "body of water" as used herein includes oceans, ponds, lakes, marshes, seasonal streams, cisterns, vaults, basins, or other containment area with standing or flowing water.

The term "invasive organism" as used herein means an organism that spreads prolifically and undesirably or harmfully and are thus desirably controlled. Accordingly, the term "invasive aquatic organism" means an organism as defined in this paragraph that lives in a body of water as defined herein and the organism spreads prolifically and undesirably or harmfully. The term "trolling" as used herein will be understood to include movement over a surface or train any of various rates of travel including fast rates and slow rates and variable rates as well as intermittent steps and incremental steps that may be uniform, periodic or variable.

Recent outbreaks of mosquito borne illnesses, including the Zika Virus, Eastern Equine Encephalitis and West Nile Fever have led to the need for new treatment methods to help control these and other pests and larvae where they congregate for long term unmanned control especially in shallow ponds and hidden areas like pits and basins with standing water.

Embodiments of the present application relate to the description in Applicants' U.S. patent application Ser. No. 15/358,067 describing the use of the invention to control invasive Zebra mussels and clams and other Mollusca pests. That application expressly states, "Although the description herein prominently refers to remediation of milfoil it will be understood that the present invention has application to other aquatic invasive weed species as well as mussels, clams, plants and still other aquatic species." The term "organism" as used herein will be understood to include, but not be limited to, such organisms.

Embodiments of the present invention treat aquatic organisms with Ultra Violet light that includes light rays in the C range (UV-C). Some of such embodiments utilize a biocide in addition to UV-C light. Others utilize only the biocide in a manner that minimizes the distribution of the biocide throughout the body of water in which the invasive organism is found.

Other embodiments of the present invention are directed to the use of a herbicide to destroy invasive weeds and particularly to provide a practical way of using a herbicide in a manner that minimizes the amount of herbicide that is necessary and thereby minimizes the cost and environmental impact of a herbicidal approach to resolve the impact of invasive weeds. Although the description herein prominently refers to remediation of milfoil it will be understood that the present invention has application to other aquatic invasive weed species as well as mussels, clams, plants and still other aquatic species and organisms. Those skilled in the art will recognize that other biocides will be appropriate for other organisms. The term "biocide" is defined as a chemical substance or microorganism intended to destroy, deter, render harmless, or exert a controlling effect on any harmful organism by chemical or biological means. The term "means for controlling" as used herein means any means for destroying, deterring, rendering harmless, or exerting a controlling effect on any harmful organism including but not limited to chemical or biological means.

BACKGROUND OF THE INVENTION

The manner of utilizing a remediation agent is dependent on the nature of the specific organism and the specific change agent. Although UV-C light has been used to sterilize water, the utilization of UV-C in large bodies of water is complicated by the depth and clarity of the water as well as the irregularity of the surfaces on which various organisms are found and the effectivity of UV-C light in controlling the target organism.

There are several methods used for treating aquatic weeds such as milfoil. These include mechanical harvesters, manual weed pulling and removal, herbicides and floor screens, barriers or large mats. The use of UV-C light waves is also a potential treatment method as described in the incorporated patent application. The teachings of that application led to this application to expand the number and types of treatment methods to battle the growing global environmental problems caused by invasive aquatic species. The infestation of aquatic plants in lakes, ponds and waterways is growing rapidly and prior art methods have not been effective or practical and new and better treatment methods are needed. Some embodiments of the present invention offer an alternate treatment method that isolates and treats the aquatic plants in a small containment volume of the chamber where herbicides, chemicals or even UV-C light waves can be used to destroy the contained plants. The UV-C ultraviolet light wave treatment method incorporated by reference in this application describes in greater detail may be combined with the apparatus described herein.

Prior art aquatic weed remediation apparatus and methods include mechanical harvesters, mowers, hand pulling, smothering or barrier mats and herbicides are the primary aquatic plant treatment and control methods currently used. One of the above current methods used to treat and kill milfoil (aquatic plants) is barrier mats that cover and smother the plants. Divers swim out to an infected area and submerge a large plastic, or rubber, or fabric mat on top of the milfoil. Some mats are in large rolls that are unrolled underwater. They add weights to hold the mats in place at the floor of the body of water. (The term "floor" used herein refers to the land mass that supports a body of water.) The mat may have slits or vents to allow air and built up gases produced by decaying material to escape. The covered plants are eventually killed by the smothering action of the mats. The mats may remain over the plants for three (3) months before divers retrieve the mats. The retrieved mats need to be cleaned and decontaminated after use. They are usually rolled up for storage until ready for use. Herbicides are also used for treatment and may be applied by surface sprays or by hose directly under water.

The prior art methods an apparatus involve complications. For example, mechanical harvesting methods leave behind large quantities of plant fragments that end up growing and causing additional infestations. Barrier mats require several divers to swim to an infested milfoil plant area and lower the mats over the milfoil. The divers then must add weights to prevent the mats from drifting away due to water currents. After 3 months, the divers need to return and remove the weights and the mats. Installation and removal is a very time consuming and extremely costly operation. It is also considered dangerous work for the divers. While such mats sit on the floor of the body of water for months, some plants will grow through the vent slits and sediment will settle on top of the mats making removal and cleaning of the mats very difficult.

Prior art herbicide use requires large amounts of costly herbicide to obtain the concentrations needed in open bodies of water for treating surface and submerged plants. The herbicide quickly mixes with the water initially forming very high concentrations followed by very low concentration as the herbicide becomes diluted with water. The dilution of the herbicide greatly limits effectiveness. It is virtually impossible to obtain and control the proper concentration for effective treatment. Only a very small fraction of the herbicide ever encounters the plants. Concerns about water pollution and health effects with drinking water contaminated with herbicides along with plants becoming resistant to the applied herbicide and high cost of the herbicide severely limit its use. Allowing large amounts of herbicide to mix and become diluted in open bodies of water facilitates the plants becoming resistant to the herbicide. Once fully diluted the entire body of water is contaminated with herbicide and that can upset the ecosystem. Many unforeseen environmental problems can result.

From the above, it is therefore seen that there exists a need in the art to overcome the deficiencies and limitations described herein and above.

SUMMARY OF THE INVENTION

It has now been found that these and other objects of the invention include an apparatus which includes means for controlling an invasive aquatic organism, the means including a trolling apparatus for trolling through a body of water, and for attachment to an associated vehicle. The trolling apparatus has a housing having a means for attachment to an associated vehicle, such that the housing is pulled through a body of water in response to movement of the associated vehicle, the housing further carrying a plurality of UV-C light sources for producing UV-C light at a wavelength of substantially 254 nm, whereby invasive organisms proximate to light emanating from at least one of the UV-C light sources are exposed to UV-C light at a wavelength of substantially 254 nm resulting in controlling the invasive organism.

In some forms of the apparatus the trolling apparatus has a surface that is elongated and dimensioned and disposed for movement in a direction that is aligned with the direction of elongation thereof. Other forms of the invention include a trolling apparatus that has a surface that is flexible enough to at least partially conform to an irregular surface on which an invasive organism is disposed whereby the increased effectiveness of the UV-C light is achieved because of the greater proximity. The trolling apparatus may have a plurality of UV-C light sources that are LED devices. Other embodiments use mercury vapor or other UV-C light sources.

Some embodiments of the trolling apparatus include a means for attachment that cooperates with an associated hoist to facilitate lifting of the surface, followed by lateral movement and depositing the surface in a different part of a virtual grid defined on a body of water.

Other embodiments of the invention include the method which includes providing means for controlling an invasive aquatic organism, providing means for controlling that includes a trolling apparatus, providing an attachment for an associated vehicle, providing the trolling apparatus with a housing having a means for attachment to an associated vehicle, whereby the housing is pulled through a body of water in response to movement of the associated vehicle, providing the housing with a surface; and providing a plurality of UV-C light sources for producing UV-C light at a wavelength of substantially 254 nm, including providing the light sources on the surface whereby invasive organisms proximate to light emanating from at least one of the UV-C light source whereby invasive organisms are exposed to UV-C light at a wavelength of substantially 254 nm resulting in controlling an invasive organism.

Some embodiments of the method include the step of providing a trolling apparatus that includes providing a surface that is elongated and dimensioned and disposed for movement in a direction that is aligned with the direction of elongation thereof. The method may include the step of providing a trolling apparatus that includes providing the apparatus with a surface that is flexible enough to at least partially conform to an irregular surface on which an invasive organism is disposed whereby the increased effectiveness of the UV-C light is achieved because of the greater proximity.

The method may include the step of providing a plurality of UV-C light sources includes providing LED light sources. The method may include the step of providing means for attachment that cooperates with an associated hoist to facilitate lifting of the surface, followed by lateral movement and depositing the surface in a different part of a virtual grid defined on a body of water.

An object of some embodiments of the present invention is to provide an improved method of treating and destroying aquatic plants such as milfoil with apparatus that produces the desired result while minimizing the cost and quantity of herbicide utilized.

Additional objects of some embodiments of the present invention eliminate the need for divers, to substantially reduce the use of herbicides to a small fraction of present use, to reduce costs, to reduce pollution, to speed up the treatment process and to improve safety. In lieu of treating the milfoil plants in open water some embodiments of the present sinks a containment chamber over organism that is to be controlled.

For example, if the organism to be controlled is milfoil, a containment chamber is dropped over the tall growing milfoil plants and consolidates them in a densely packed area within the chamber at the floor surface. This small contained treatment chamber volume is then treated with herbicide, and or other additives, when the exposure time is complete the herbicide mix is recycled back into a storage bladder for reuse or it is filtered through an activated carbon filter back into the water. The chamber method also allows for use of UV-C ultraviolet light waves alone or in combination with herbicide or other chemicals to control aquatic organisms. It will be understood that the chamber in most preferred embodiments has an open bottom. The open bottom facilitates in some cases movement of the chamber over aquatic vegetation. In accordance with conventional patent claim drafting practice, that is reluctant to claim empty space, it will be understood that the structure involved which might also be called cup shaped, bell shaped, inverted pan or bowl shaped, or an inverted chamber may also be described as a housing having a concave cavity. The term "concave" will be understood to include the inner surface of a bowl or sphere. Those skilled in the art will recognize that this terminology reads on the structure described herein. Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all these objects are present as essential features, either individually or collectively, in the most general embodiment of the present invention or in any of its more specific embodiments.

Objects of some embodiments of the present invention are achieved in a method for remediation of aquatic vegetation disposed at least partially in a body of water such as a lake, pond, river or ocean having a floor which includes providing a housing having a concave cavity having a periphery; orienting said housing with the concave cavity facing downward; providing a remediation agent selected from the group consisting of chemicals, microorganisms and a source ultraviolet light in the "C" range; moving the housing with the concave cavity facing downward over the aquatic vegetation to be remediated; and positioning a quantity of remediation agent within the concave cavity whereby the distribution of the remediation agent in the body of water is limited by the concave cavity.

In some embodiments of the present invention the remediation agent is selected from the group consisting of herbicides, insecticides, and microbes. The method may include moving the housing with the concave cavity facing downward over the aquatic vegetation to be controlled. The step of providing a housing may include providing a housing having a peripheral seal extending along substantially the entire periphery of said concave cavity and which limits entry of water from the body of water into the concave cavity. The step of providing a remediation agent may include the step of providing a reservoir containing an herbicide. The method may further include providing a reservoir containing herbicide and the reservoir is disposed within the concave cavity within the housing.

Some embodiments of the method in accordance with the present invention includes the step of providing UV-C ultraviolet light generating apparatus within the housing to further augment destruction of undesired vegetation. The method may further include the step of trolling the housing through a body of water as well as positioning the housing in substantially sealing relationship with the floor underneath the body of water. The method may include the step of filtering water within the concave cavity to extract herbicide therein as well as the step of returning herbicide to the reservoir upon removal from the water within the concave cavity. The method may further include the step of providing a reservoir having a variable volume the outer envelope of the reservoir changes dimensions with increase or decrease of the quantity of herbicide disposed therein.

Some embodiments of the method in accordance with the present invention further include the step of providing remote controls for the elevation of the housing as well as the latitude and longitude thereof. The method may further include providing flotation chambers attached to the housing to facilitate elevational changes of the housing. Some embodiments include the step of adding or removing air from the flotation chambers to impact the elevation of the housing. In some cases, filtration of the water in the concave cavity is achieved with an activated carbon filter.

The method may include the use of a vacuum pump to deflate flotation members to cause the housing to move to a lower elevation within the body of water. The method may include intentionally causing the housing and the concave cavity to compact weeds below the concave cavity and in some cases to push the periphery of the concave cavity against the floor of the body of water. Some embodiments of the method further include the step of providing an air cylinder and selectively adding air to the flotation chambers to impact the elevation of the housing.

The method may further include the step of providing at least one pump to move herbicide between the concave cavity and the reservoir as well as the step of providing a dose dispensing cylinder to determine the quantity of herbicide deposited in the concave cavity. Other embodiments of the method may include apparatus for controlling a position of the housing from a boat.

Some embodiments of the present invention include a method which includes providing means for controlling mosquitos, which comprises providing means for attracting mosquitos with UV-C light and means for controlling mosquitos that includes utilizing UV-C light as well as mosquito eggs, larvae, and pupae.

In some embodiments the method includes providing a solar collector to power the UV-C light. Furthermore, the method may further include providing means for storing electrical power, provided by the solar collector, and selected from the group consisting of a battery and a capacitor.

Some embodiments of the present include a method which includes providing means for controlling mosquitos, which comprises providing means for attracting mosquitos with movement of a physical structure and means for controlling mosquitos that includes utilizing UV-C light as well as any mosquito eggs, larvae, and pupae.

The method may further include providing a solar collector to power the UV-C light. The method may further include providing means for storing electrical power, provided by the solar collector, selected from the group consisting of a battery and a capacitor.

The means for controlling mosquitoes may comprise means for attracting mosquitoes selected from the group consisting of providing UV light, dark colors including but not limited to black, $CO_2$, a scent, body heat, warm temperatures, object movement, and air motion; and the means for controlling mosquitos utilizing UV-C light exposure may further include exposing the attracted mosquitoes to UV-C light as well as exposing any mosquito eggs, larvae, and pupae.

The method may further include providing a solar collector to power the UV-C light. The means for storing electrical power, provided by the solar collector, may be selected from the group consisting of a battery and a capacitor.

BRIEF DESCRIPTION OF THE DRAWINGS

The foregoing and other objects, features and advantages of the invention will be apparent from the following more particular description of illustrative embodiments of the invention, as illustrated in the accompanying drawings in which like reference characters refer to the same parts throughout the different views. The drawings are not necessarily to scale; emphasis instead being placed upon illustrating the principles of the invention. Those skilled in the art will understand that the devices and methods specifically described herein and illustrated in the accompanying drawings are non-limiting exemplary embodiments. The features illustrated or described in connection with one exemplary embodiment can be combined with the features of other embodiments. Such modifications and variations are intended to be included within the scope of the present invention.

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Applicants' U.S. patent application Ser. No. 15/358,067 describes the use of the invention to control invasive Zebra mussels and clams and other Mollusca pests. The term "organism" as used herein will be understood to include but not be limited to such organisms.

Embodiments of the present invention treat aquatic organisms with Ultra Violet light that includes light rays in the C range (UV-C). The technology enables treatment despite irregular contours of surfaces on which the organisms are located as well as the enormity of the ambient in which the organisms are found. The many millions of mussel eggs and young larval produced can be quickly treated by trolling the UV-C Apparatus over them. By eliminating the light sensitive mussel larvae (glochidia), including the free swimming glochidia, the high rate of regrowth is limited, and massive infestations are eliminated or controlled.

The apparatus will treat mussels on various irregular surfaces. The apparatus will expose the mussels and their larvae to a lethal dose of UV-C rays. The young mussel larvae with thin shells and light sensitive eggs would quickly succumb to the high-level radiation and die. Periodic treatments shortly after mussels lay their larvae will control the mussels to acceptable levels. With subsequent treatments the mussel population will drop to a lower level with each treatment.

In a preferred embodiment for treatment of mussels, for example, utilizes a semi-flexible UV-C light that enables the apparatus to conform to the surface where the mussels are disposed. The flexibility helps to maintain the lethal distance between the UV lamp surface and the mussels. When remediating tall flexible plants (for example, Milfoil plants that may even be 8' tall, the apparatus consolidates the plants as the apparatus is lowered to within a foot from the bottom. Mussels on the other hand are rigid and cannot be consolidated. Mussels are typically disposed on irregular surfaces such as rocks, piers and columns. Accordingly, a flexible mat apparatus that includes a plurality of UV-C emitting lamps is particularly useful on these irregular surfaces.

Figure 3:
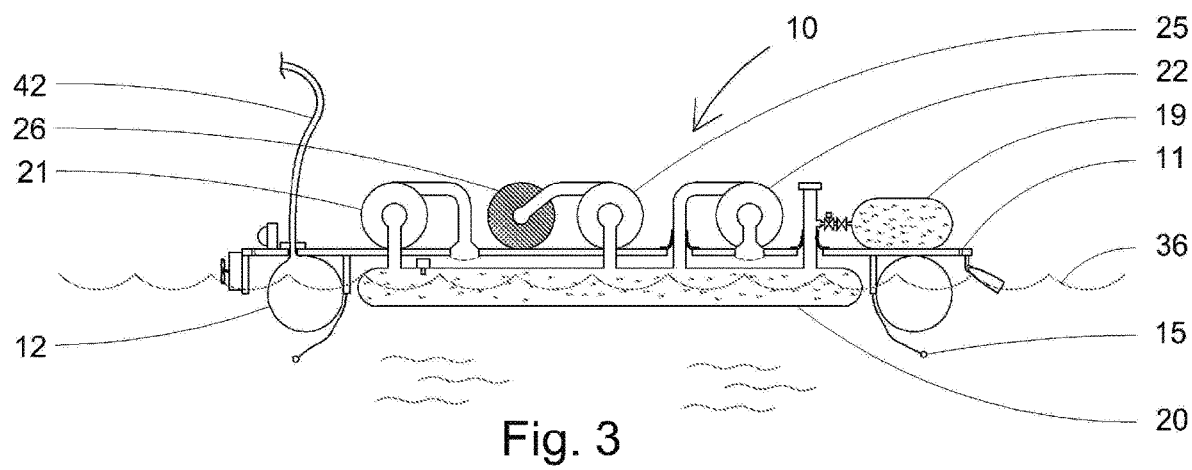
FIG. 3 is a schematic elevation view of the chamber on the water surface with inflated floatation tubes and the storage bladder filled with herbicide mix.
Figure 4:
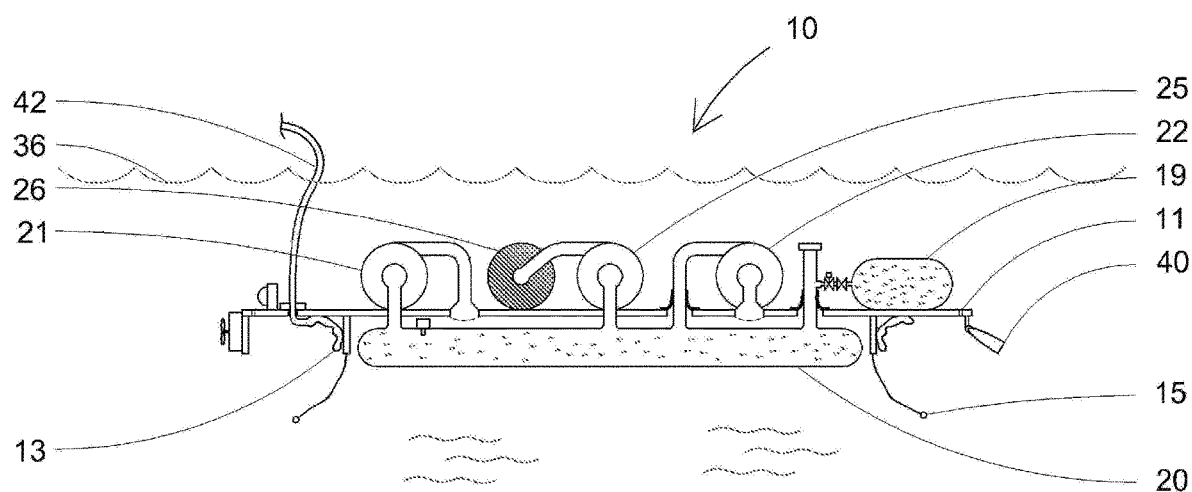
FIG. 4 is a schematic elevation view of the chamber, as shown above, sinking after the floatation tubes are deflated.
Figure 5:
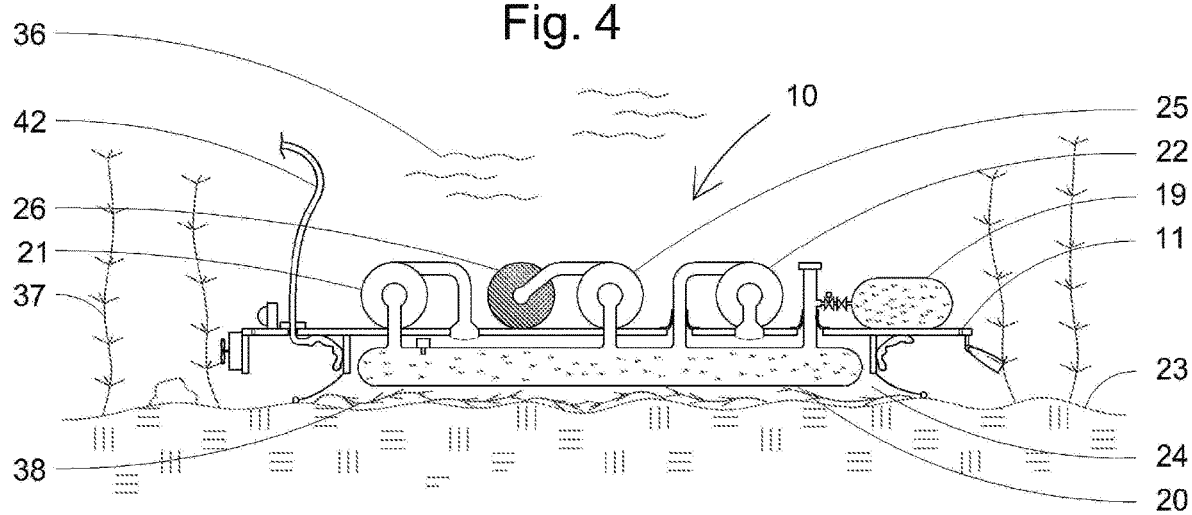
FIG. 5 is a schematic elevation view of the chamber, as shown above, resting on the floor over deflected milfoil plants to be treated.
Figure 13:
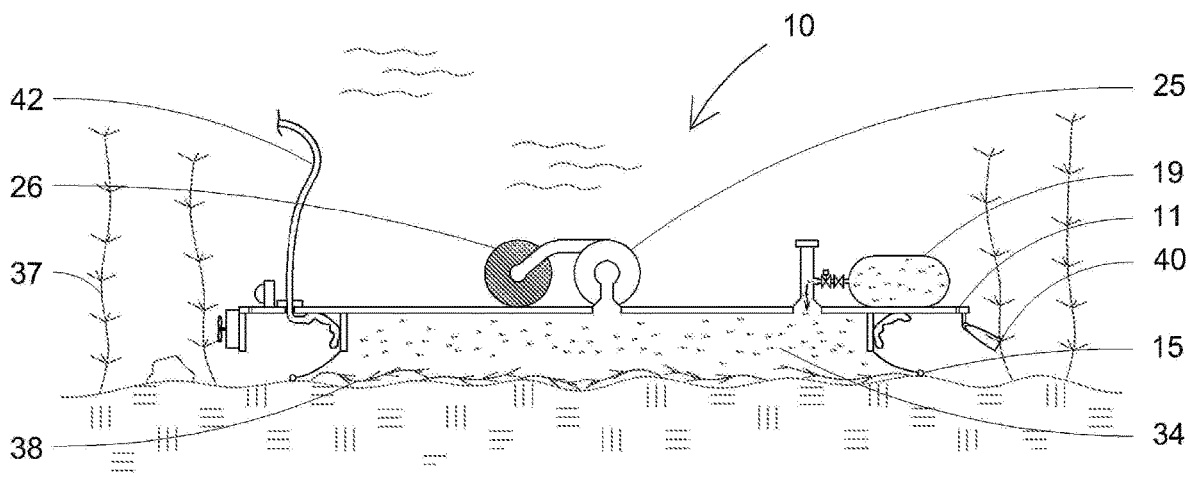
FIG. 13 is a schematic elevation view of a variation of the remote-controlled chamber, after a dose of herbicide is introduced into the chamber providing the selected herbicide mix to treat the milfoil plants. The flotation tubes are shown deflated.
Figure 14:
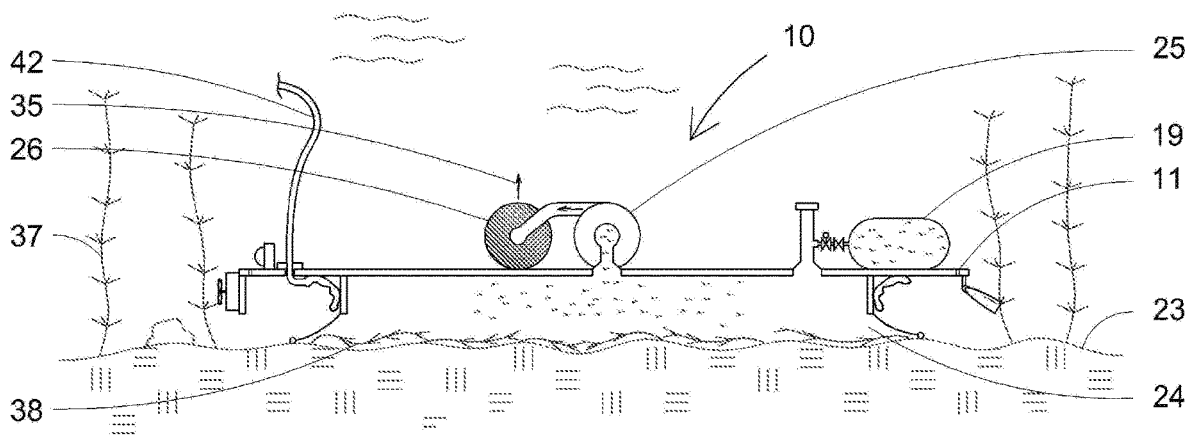
FIG. 14 is a schematic elevation view of a variation of the remote-controlled chamber, after the milfoil plants are treated and the herbicide mix is being pumped through an activated carbon filter.
Figure 15:
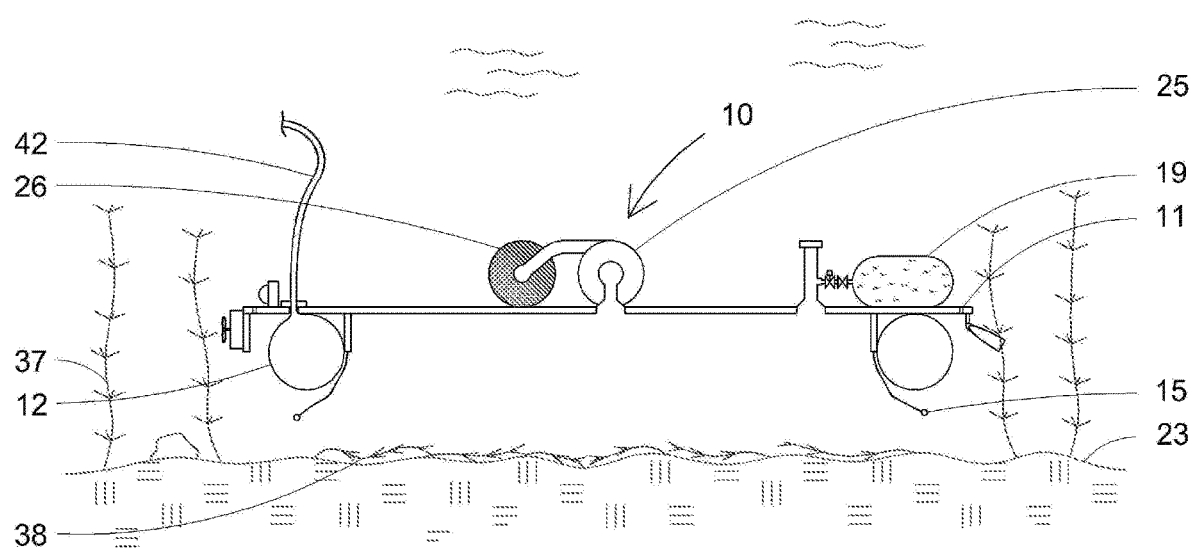
FIG. 15 is a schematic elevation view of a variation of the remote-controlled chamber, after the milfoil plants are treated and filtration tubes are inflated, and the chamber is rising toward the surface.
Figure 16:
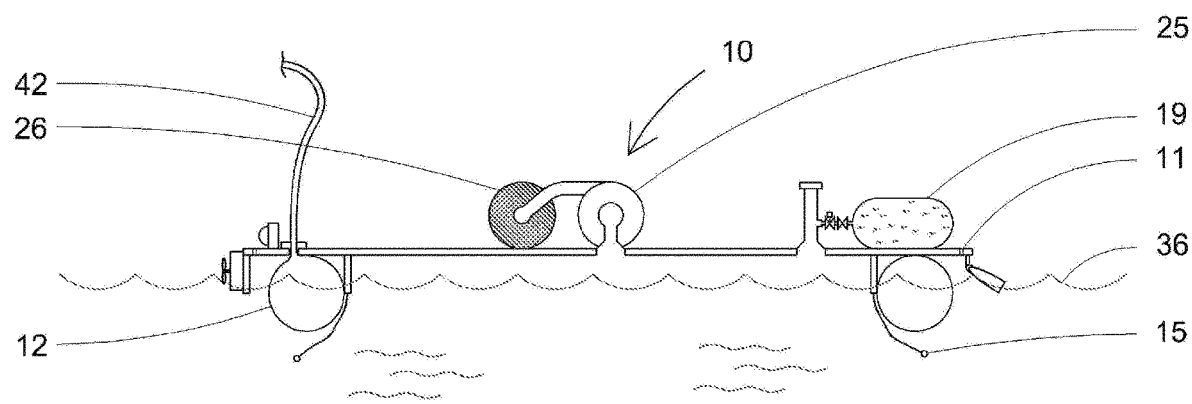
FIG. 16 is a schematic elevation view of a variation of the chamber with the flotation tubes are inflated and the chamber back on top of the water surface.
Figure 17:
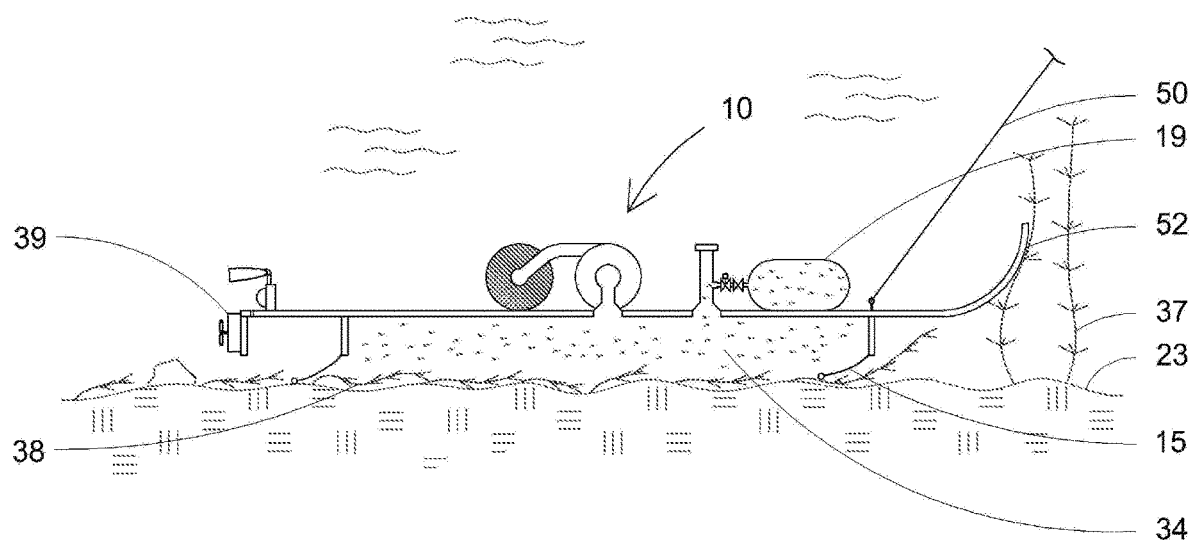
FIG. 17 is a schematic plan view of a variation of the remote-controlled chamber with a deflector so the chamber can be moved in a continuous manner treating the milfoil plants along the floor.
Figure 18:
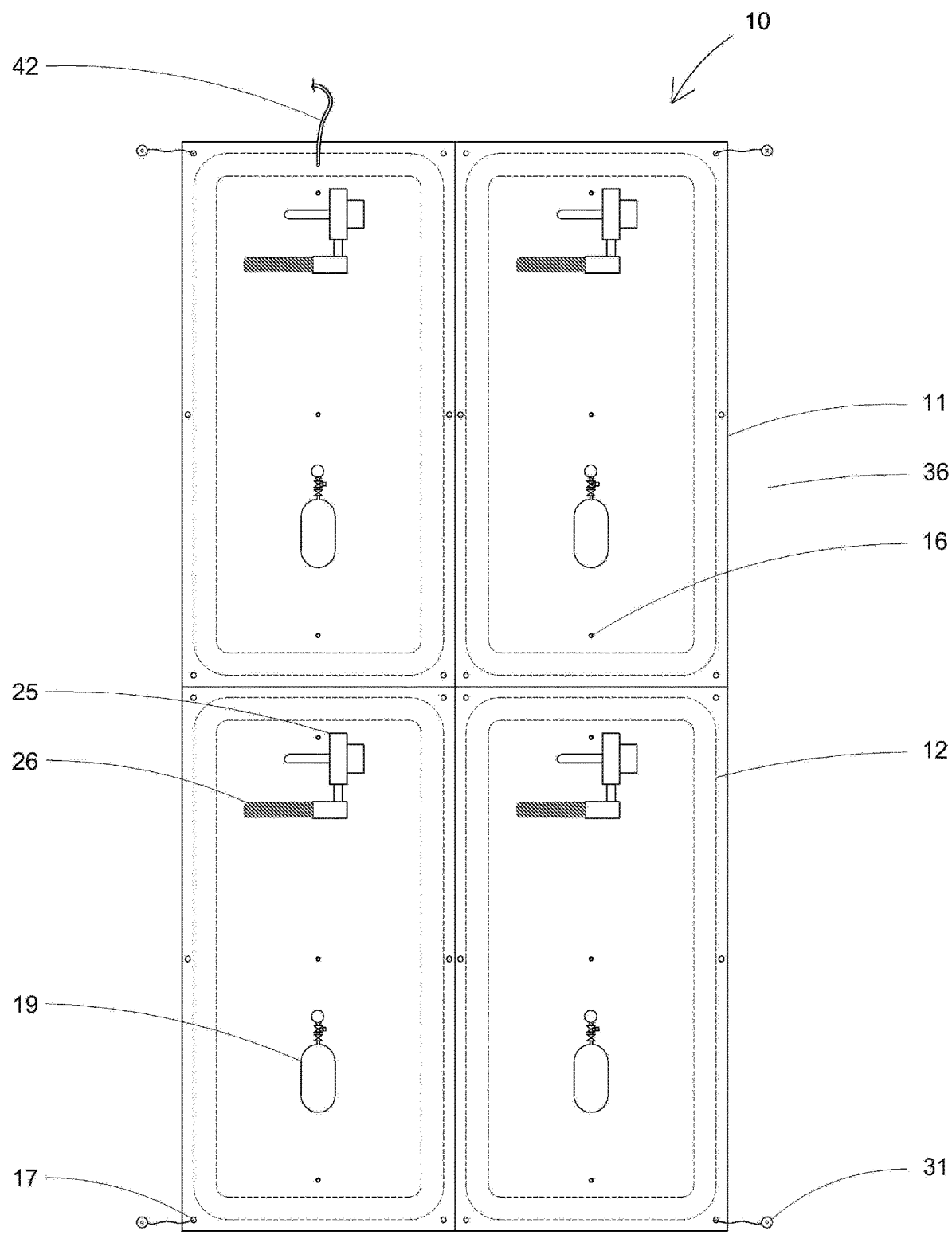
FIG. 18 is a schematic plan view with multiple chambers fastened together to form a larger chamber treatment area.

The incorporated by reference U.S. patent application Ser. No. 15/184,367 (now U.S. Pat. No. 9,622,465) include embodiments in FIGS. 13 and 14 (as well as the respective descriptions thereof) that are particularly advantageous for remediation of mussels and similarly disposed organisms. In addition, FIG. 3 discloses a flexible enclosure embodiment and FIG. 17 discloses a drag mat embodiment (as well as the respective descriptions thereof) that are also particularly advantageous for remediation of mussels and similarly disposed organisms.

As noted in application Ser. No. 15/358,067, a variation of the invention includes a large semi-flexible chamber with floatation tubes in the form of a large flexible sheet with a rigid portion to hold certain components can be provided. For example, the chamber may be 12' wide by 24' long and have floatation tubes to keep the chamber afloat when the tubes are inflated. Thus, the chamber will sink when the tubes are deflated. The chamber is remotely controlled or towed into position in some embodiments. When the chamber is used with microbes, the chamber will remain on the floor for longer periods to give the microbes a better chance of digesting the decaying plants.

As also noted in application Ser. No. 15/358,067, one form of the apparatus includes a Floatation Containment Chamber 11. The chamber 11 may, for example, be built in a modular design that can be joined together to make for a large treatment unit. The preferred chamber module size may be 4' wide by 8' long. The chamber may have a solid, semi-solid or flexible top surface with at least a portion that is ½" thick high-density polyethylene (HDPE) or other durable material to support other items to such as pumps, weights 14 filter, area lights, video cameras and other items. The perimeter skirt of the chamber may have a 2" high angle where it connects to the chamber top surface, so it forms a 4'×8' by 2" high inverted chamber volume that is called the containment volume 24. Once the containment volume 24 is on the floor 23 it will occupy a volume of 5.33 cubic feet or 40 gallons. The selection of 2" height is for example purposes only and the bladder height may be best determined by the floor 23 terrain and milfoil 38 plant densities. The top of the chamber 11 may have one-way vent 16 ports that allow for any trapped air within the containment volume 24 to escape.

Various embodiments of the Chamber 11 are rigid, semi-flexible, flexible, opaque, clear, and of any size and shape suitable for the specific application. The shape of the container may be concave shaped, irregular shaped, a drag mat or semi-contained. In use the chamber 11 may be towed, lowered and raised, powered, trolled, stationary, or positioned in such a way as to accommodate any species to be treated.

Application Ser. No. 15/358,067 further states that the reference number 37 refers (at column 20) to "Milfoil 37. Milfoil." This term is used to include all aquatic species of plants including Eurasian watermilfoil (*Microphyll spicatum*). Although the description uses this term it will be understood that the apparatus and method of the present invention have application to other aquatic plants including surface plants and other species such as invasive Zebra mussels and clams and other Mollusca pests that are subject to treatment and eradication." Similarly, the application makes express reference to the trolling unit 39.

The apparatus in accordance with the present invention is an effective and practical tool for treating mussels and similar organisms. This technology can be applied to all surfaces where mussels grow and where eggs and larvae and pupae occur. This includes piers, pilings, structures in the water, boat hulls, rocks and bottom sediment. It can also treat free swimming eggs, larvae, and pupae in the UV-C treatment exposure chamber area. The apparatus provides a low cost and fast method of treatment with no residual chemicals and useful wherever mussels are accessible to the lethal light rays of the apparatus.

Embodiments of the present invention have many advantages over the prior art apparatus and method. The present invention allows for remote operation and requires no divers to deploy or remove the apparatus. The chamber method allows for rapid herbicide treatment of concentrated milfoil plants within the containment volume that takes only minutes versus months with barrier mats. The isolated treatment volume of the containment volume of the chamber is a small fraction of the full height water column volume above the chamber from prior art herbicide treatment, thus allowing for a minimum of herbicide use only in the containment volume that may only be 1% or prior art herbicide use. This allows for precise herbicide concentration control for treatment and means are provided for herbicide reuse and or filtration. This method is faster, safer, easy to control, less costly, more effective, and less polluting than prior art herbicide methods.

Many embodiments of the present invention include a containment volume where treatment of organisms occur. In various embodiments the treatment may be with herbicides, pesticides, chemicals, microbes and enzymes scents, ultraviolet light including UV in the C range, vibration, electric shock (like a bug zapper), sound waves or any combination of such approaches. The treatment mechanism will be systemic or surface control of living tissue by a herbicide, damage to the cells and DNA by UV-C light rays, attraction of organisms by scent or UV light, disorientation, damage to the organism's senses such as sight, or disruption of breeding or growth cycle.

Mosquitos are attracted by UV light, dark colors, namely black, $CO_2$, certain scents, body heat and certain warm temperatures, object movement, air motion, and other conditions especially when in combination of at least several of the above attractants.

UV-C lamps provide a high level of control by directly and quickly exposing the mosquitos to a lethal dose of UV-C rays. In certain applications, UV-C rays can be used as a mosquito or insect attractant where a pesticide and other means help provide control.

For small water containing basins that become an ideal habitat for mosquitos, control can be obtained where solar or battery power is used to energize a LED type UV-C light. This may mainly be suitable as an attractant type control apparatus where damage to the mosquitos may also be by chemicals or pesticides. The Aquatic Species Treatment Apparatus could be used on a cistern, drain water vault or any other pit or water holding structure that allows standing water to exist, thereby, allowing an ideal habitat for mosquitos and their mosquito eggs, larvae, and pupae to become a health and nuisance problem.

Background information on what attracts mosquitoes to human beings and means for disruption of mosquito perception of human beings is described in U.S. Pat. No. 4,616,557 entitled Air Mixing Device and Method for Preventing Insects from Finding Human Beings issued to John A. Paoluccio, a coinventor of the present application. That patent is incorporated by reference herein.

Figure 6:
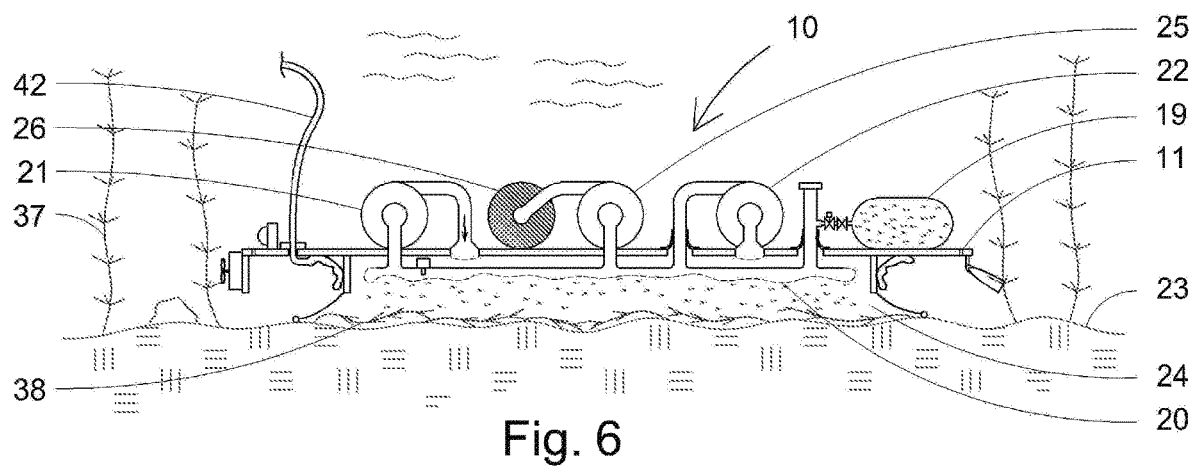
FIG. 6 is a schematic elevation view of the chamber, as shown above, resting on the floor over deflected milfoil plants. The herbicide mix is shown transferred from the storage bladder and into the chamber area thereby treating the milfoil plants.
Figure 7:
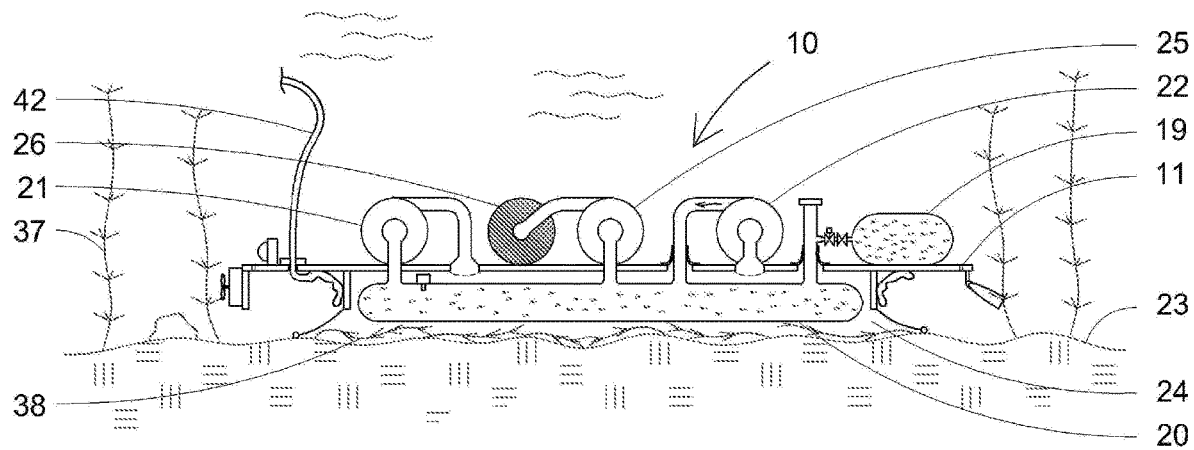
FIG. 7 is a schematic elevation view of the chamber, as shown above, resting on the floor over the deflected milfoil plants after being treated. The herbicide mix is shown transferred from the containment chamber area back into the storage bladder. The floatation tubes are still shown deflated.
Figure 8:
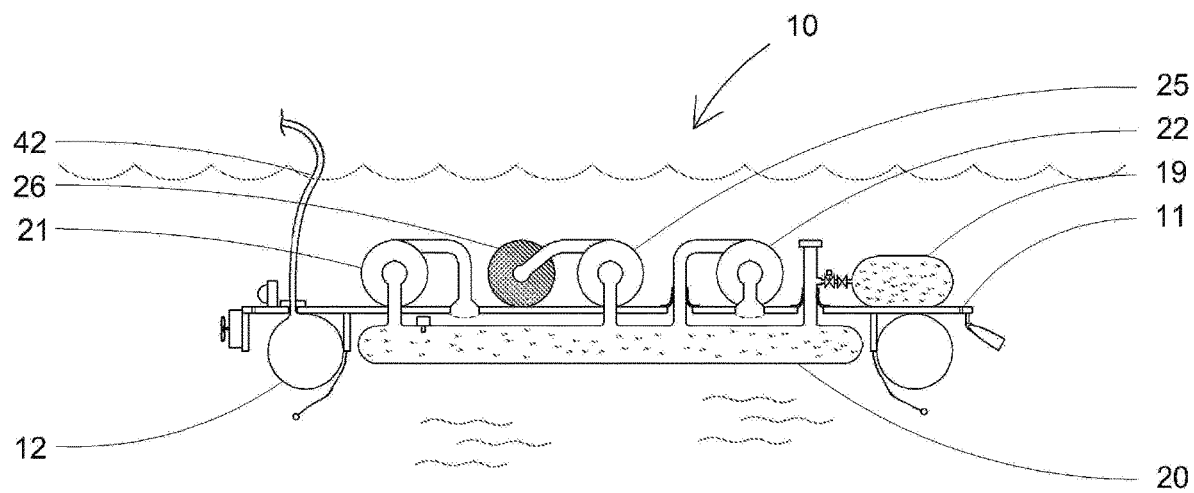
FIG. 8 is a schematic elevation view of the chamber, as shown above, rising in the water toward the surface after the floatation tubes are inflated.
Figure 9:
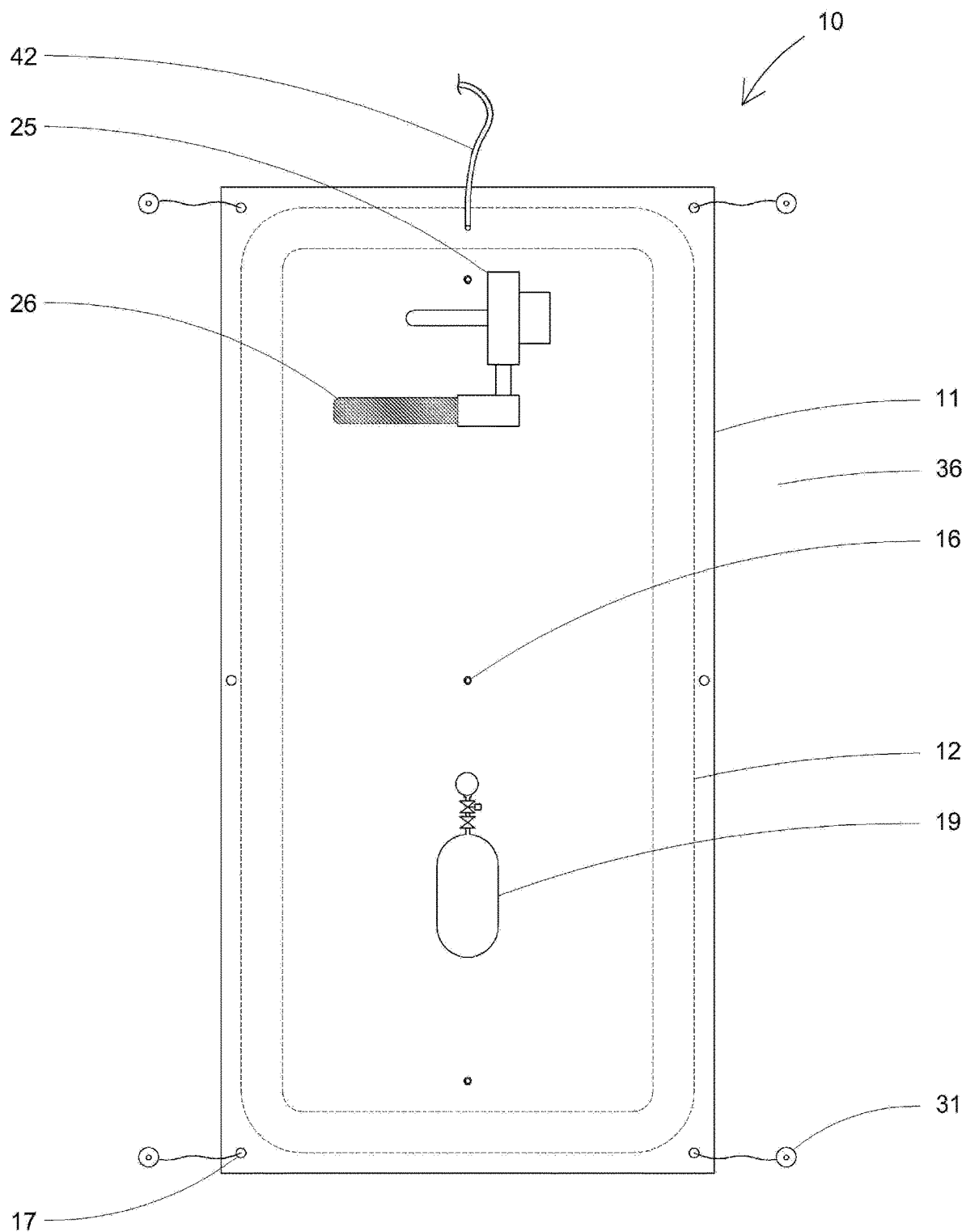
FIG. 9 is a schematic plan view of a variation of the chamber, without the storage bladder, on the surface of the water, with the herbicide cylinder, filter pump and activated carbon filter.
Figure 10:
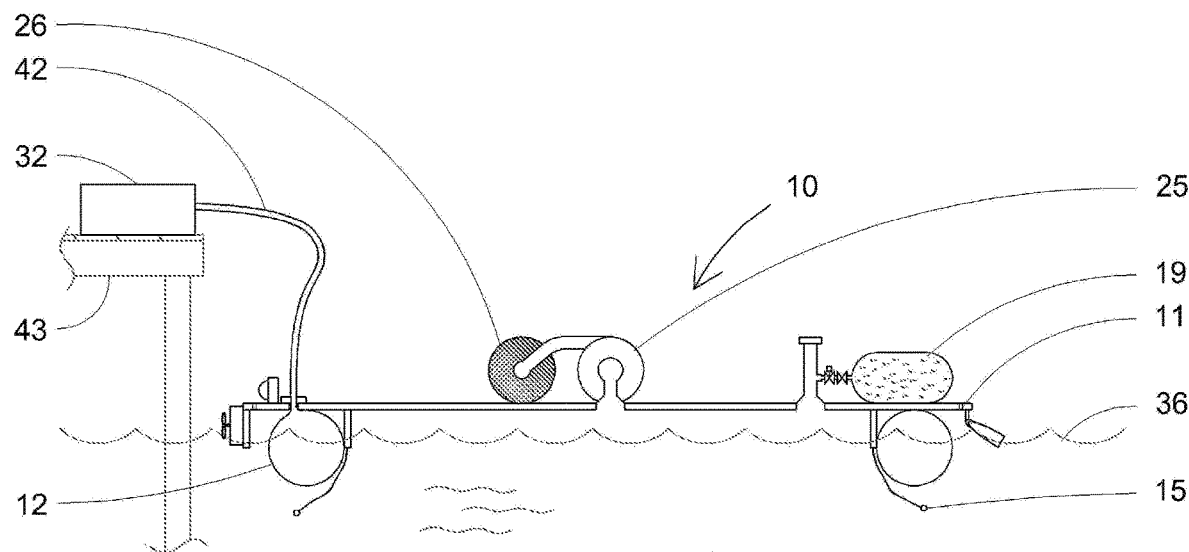
FIG. 10 is a schematic elevation view of a variation of the chamber, without the storage bladder, on the surface of the water, with the herbicide cylinder, filter pump and activated carbon filter. The flotation tubes are shown inflated.
Figure 11:
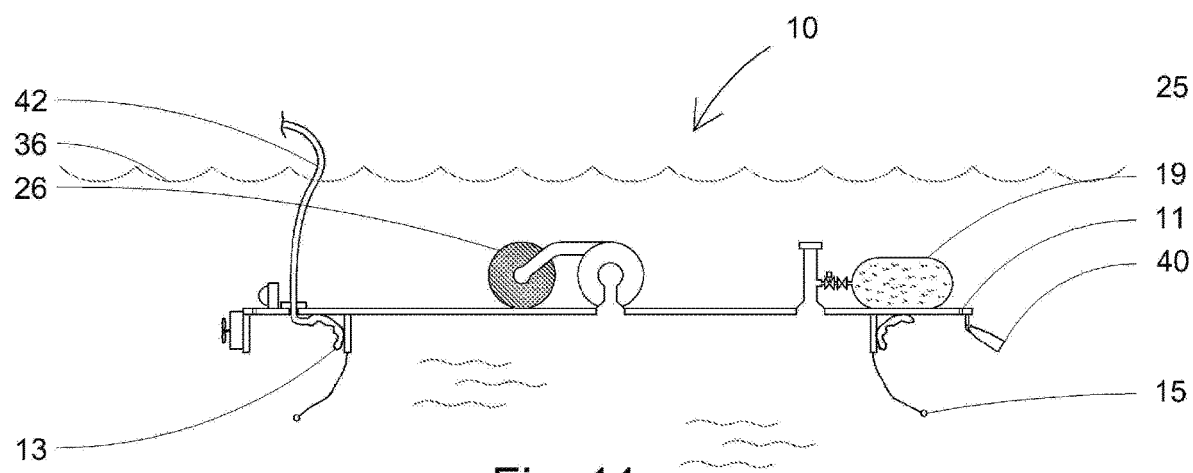
FIG. 11 is a schematic elevation view of the above variation of the chamber sinking, with the flotation tubes deflated.
Figure 12:
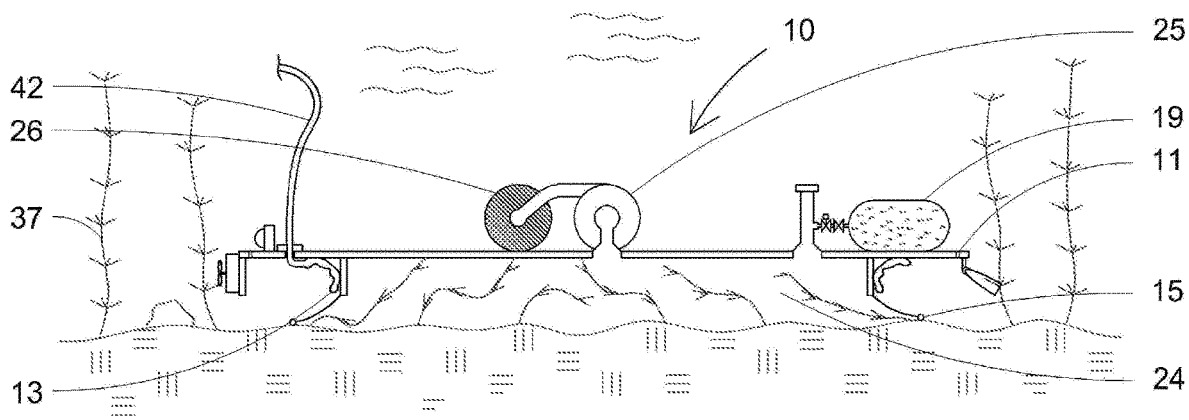
FIG. 12 is a schematic elevation view of a variation of the chamber, as it rests on the floor over the milfoil plants to be treated. The flotation tubes are shown deflated.
Figure 24:
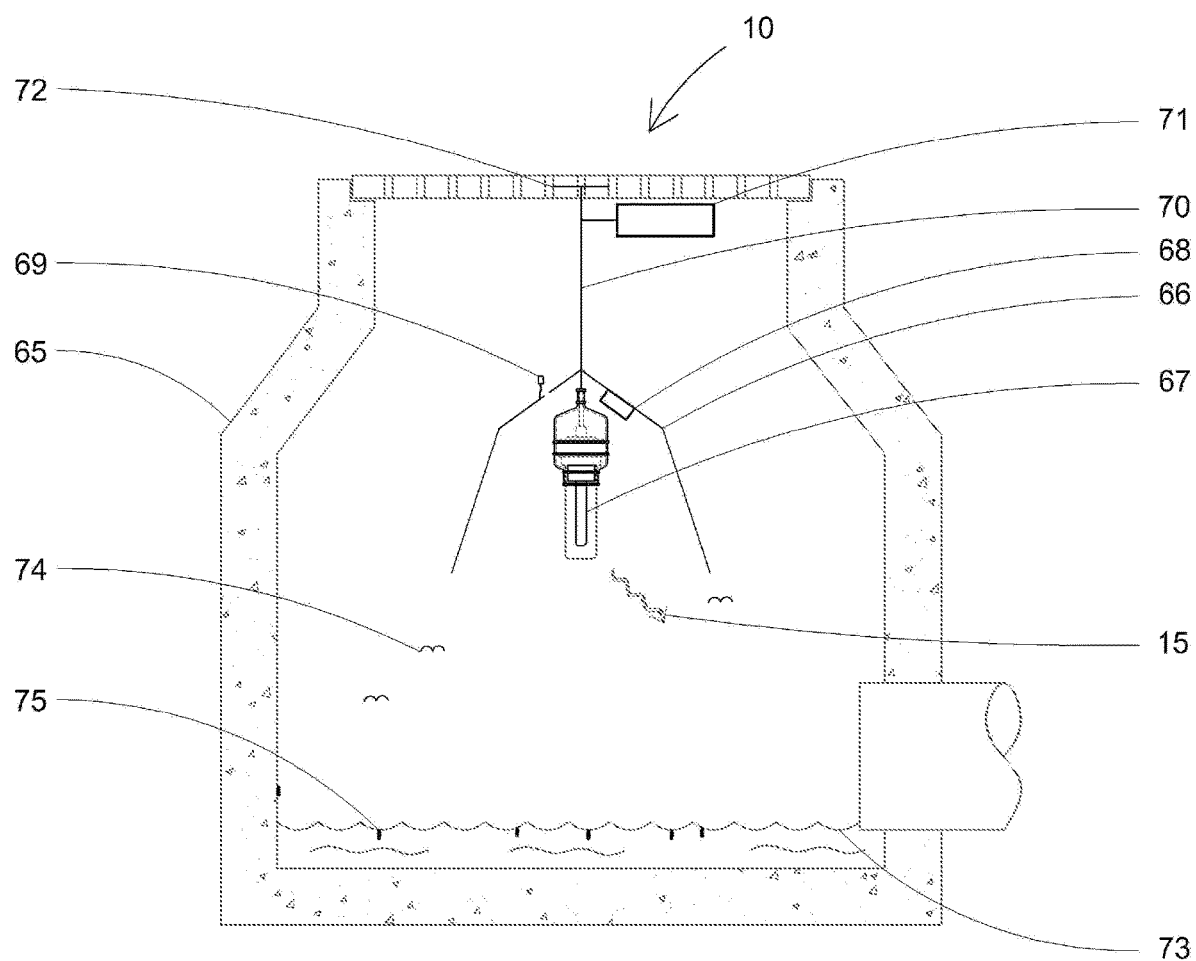
FIG. 24 is a schematic elevation view, of an embodiment of the present invention wherein the apparatus in accordance with the present invention suspended within a cistern or water containing basin with standing water. An LED type UV-C light is used in a chamber/housing to attract and control mosquitos and mosquito eggs, pupae, and larvae.

Referring now to FIG. 24 there shown a schematic elevation view of an embodiment of the present invention wherein the apparatus in accordance with the present invention is suspended within a cistern or water containing basin with standing water. An LED type UV-C light 67 is used in a chamber/housing 66 to attract and control mosquitos and mosquito larvae. FIG. 6 illustrates a Cistern or water containing basin with grate and with standing water 65 and an Apparatus chamber 66 having a housing having a black color. A UV-C lamp LED 67 is provided within the apparatus chamber 66 to both attract and control mosquitos as well as to kill mosquito larvae. A pesticide, chemical or scent 68 is provided at the chamber/housing 66 to provide additional help to control mosquitoes and mosquito larvae. A tag or flag 69 that moves due to any air movement or from warm air from the surface of the UV-C lamp 67 is provided to further attract mosquitoes. A wire and support 70 are provided for suspending the chamber/housing 66. A solar collector 71 with a capacitor or battery is disposed under the grate. An attachment clip 72 is provided for supporting the chamber/housing 66. Disposed at the bottom of the cistern or water containing basin 65 is standing water 73. In the typical manner where standing water exists mosquito larvae 75 will be disposed in the standing water 73 and mosquitoes 74 will be present above the standing water. Typically, shallow standing water accommodates female mosquito 74 egg deposits 75 on the standing water 73 followed sequentially by larvae and pupae often moving between the surface of the water and below the surface of the water.

As a further example, an application for a small water containing structure that has a drain grate that occasionally has some standing water at the bottom is a common ideal habitat example of a location where mosquitos can flourish. To treat this type application; a small apparatus it is hung from a hook under the drain grate. The apparatus could be a small partially open chamber with a LED type UV-C light that is powered by a battery or by a small solar collector at the grate. The heat from the UV-C light could cause the air adjacent to the warm lamp to rise and that air motion can be used to cause a lightweight unbalanced small tag or flag to move in a random fashion. In some variations certain chemicals or scents could be added as an attractant.

The UV-C light, in combination with heat from the light, movement of the tag, the color black, movement of the air, and any other attractants will attract the mosquitos where they will be exposed to UV light in the C range where they will be disorientated by the UV-C damage to their body cells and eyes. This can cause them to fall or interruptVCbreeding cycle. If certain pesticides are in the Apparatus this exposure could further control the mosquitos. The larva, that are furthest from the UV-C light can be damaged by long term exposure to the UV-C rays, especially as they move to the surface of the water.

Figure 1:
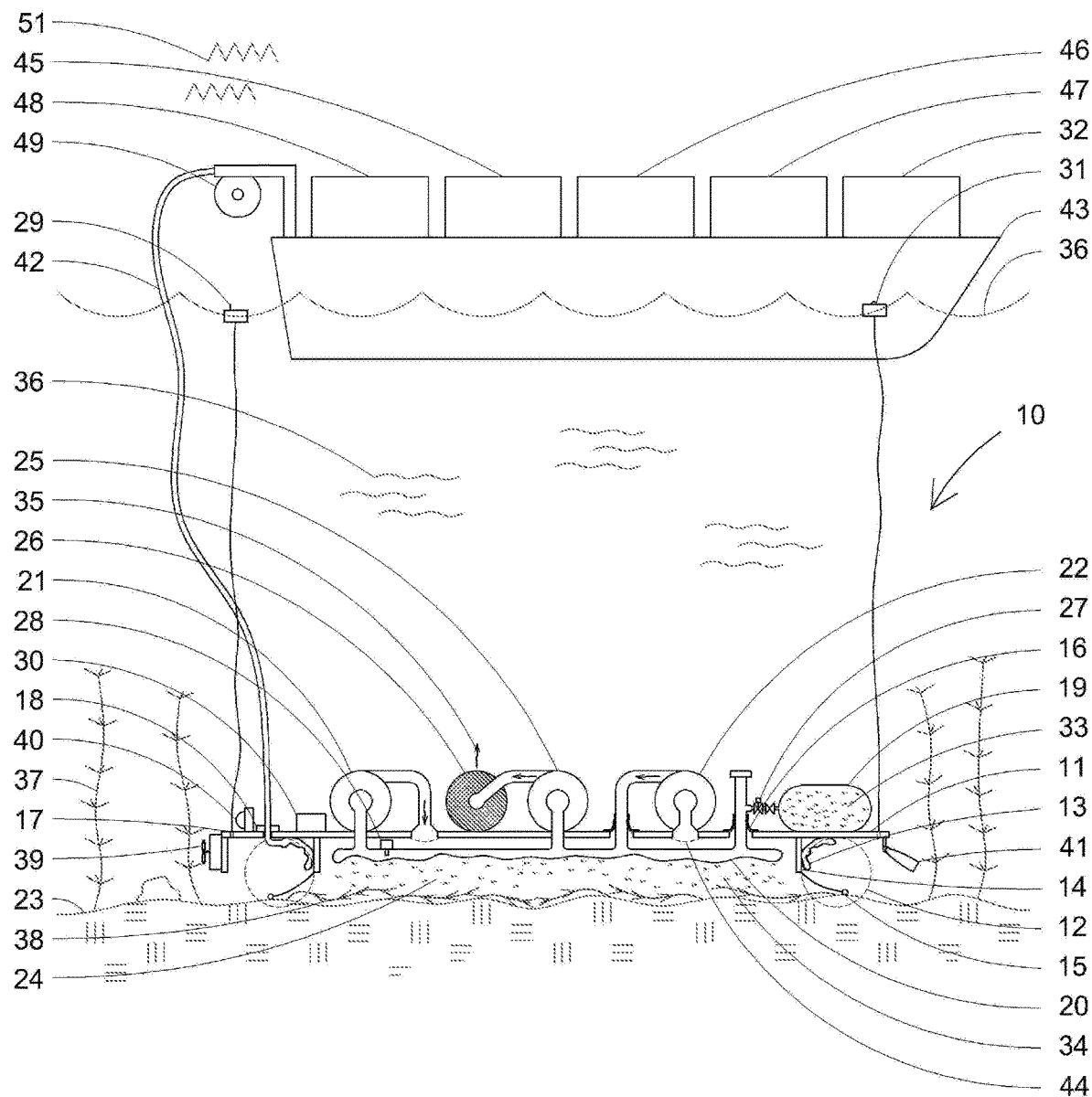
FIG. 1 is a schematic elevation cut-away view of the preferred embodiment of the chamber invention with herbicide mix storage bladder and deflated floatation tubes resting on the floor surface forming a containment volume surrounding densely packed milfoil being treated with herbicide.
Figure 2:
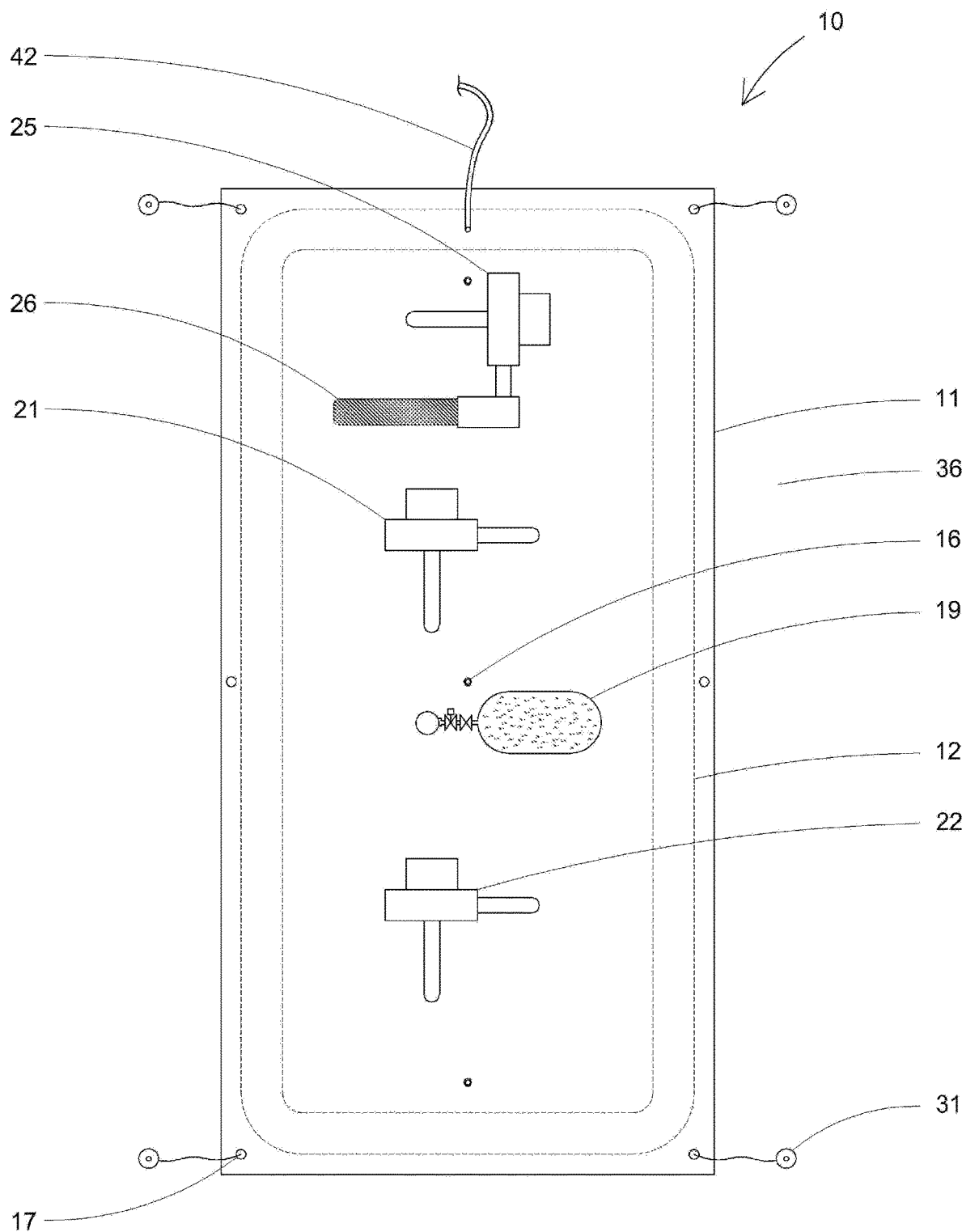
FIG. 2 is a plan view of the chamber on the water surface with pumps and filtration system.
Figure 20:
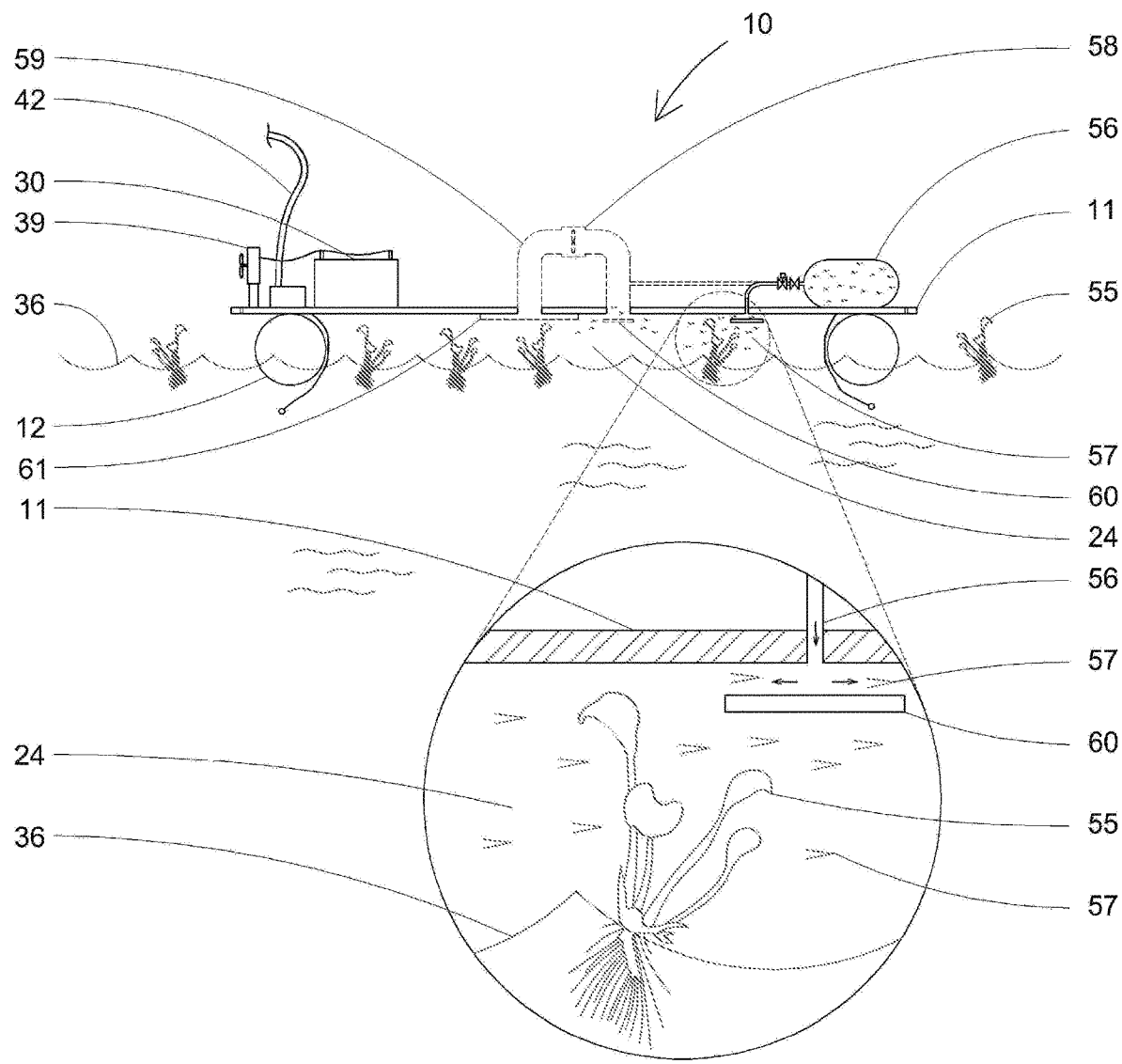
FIG. 20 is a schematic elevation view of a variation of the remote-controlled chamber on the surface of the water to treat surface aquatic plants. This includes an herbicide spray cylinder. The aerosol herbicide is sprayed directly into the containment volume to treat the surface aquatic plants. An optional circulating fan, shown dashed, can be used to cause more turbulence of the herbicide spray on the plant surfaces for improved efficiency.

Newer herbicides are being developed that have a shorter half-life and should be safer for the environment. Embodiments of the present invention utilize other additives within the treatment chamber to kill plants. In some embodiments microbes are disposed within the chamber to help digest the dead plants. The remote-control module for the chamber may be located on a boat, dock or on land. A preferred embodiment of the invention includes a storage bladder or other variable volume device to store the herbicide mix and allows reuse of the herbicide. Other variable volume devices include bellows apparatus or a balloon having an interior space as well as inlet and an outlet or a combination inlet/outlet. As shown in FIG. 1 a storage bladder 20 allows for minimizing the overall use of herbicide. More specifically the herbicide used with the apparatus and method of the present invention may be less than 1% of the quantity used when the herbicide is merely added to essentially the entire body of water being treated in prior art herbicide treatment methods. The chamber method without the storage bladder 20 as shown in FIG. 9 through FIG. 17 will still reduce the amount of herbicide to approximately 1% or 2% of prior art use. Filtration of the herbicide mix after treatment may also be provided. The chamber method may also be used for treating submerged plant and surface aquatic plants as shown in FIG. 20. The herbicide use in this variation will be much higher than chamber methods on the floor but still much less than prior art surface spray methods. Recirculating the herbicide spray with a fan as shown in FIG. 20 will be more effective for certain applications, however, the herbicide may be sprayed directly into the containment volume without a fan.

Figure 21:
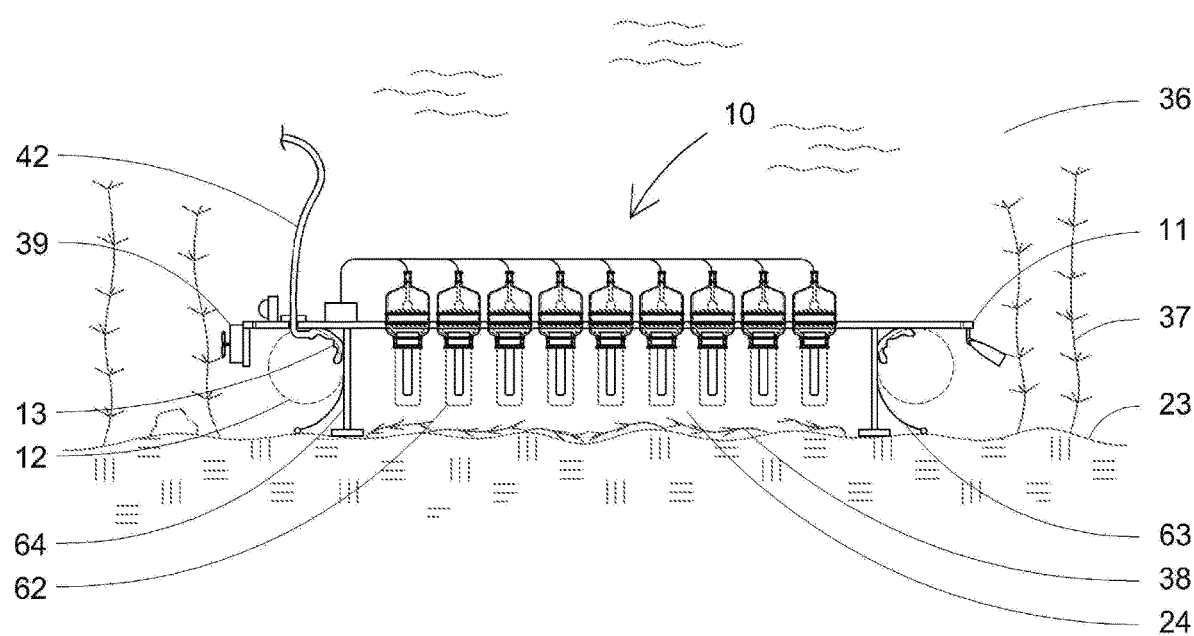
FIG. 21 is a schematic elevation view of a variation of the remote-controlled chamber on the floor to treat submerged aquatic plants. UV-C lights are used to treat the consolidated aquatic plants within the containment volume.
Figure 22:
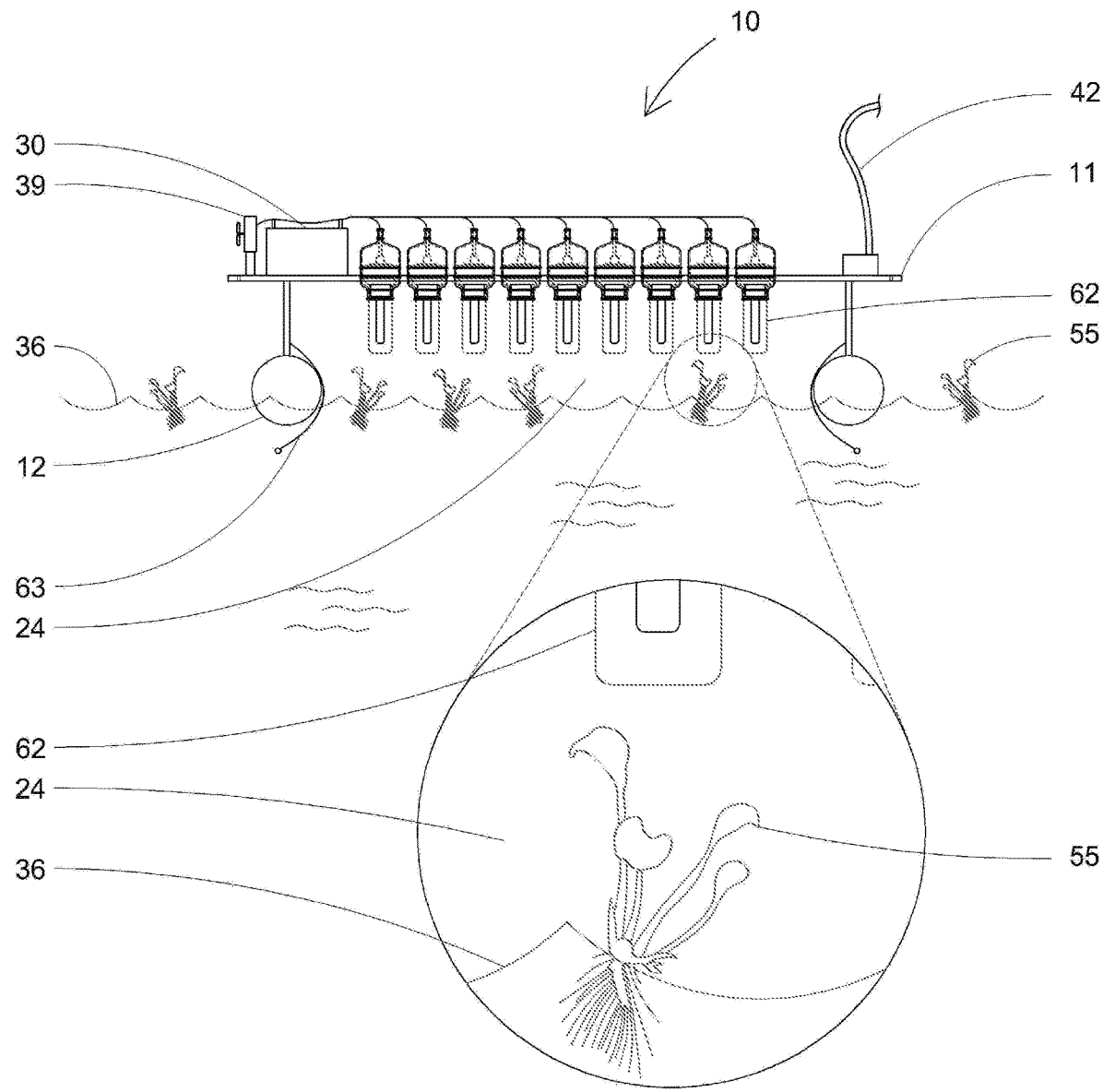
FIG. 22 is a schematic elevation view of a variation of the remote-controlled chamber on the surface of the water to treat surface aquatic plants. UV-C ultraviolet lights are used to treat the surface aquatic plants within the containment volume.
Figure 23:
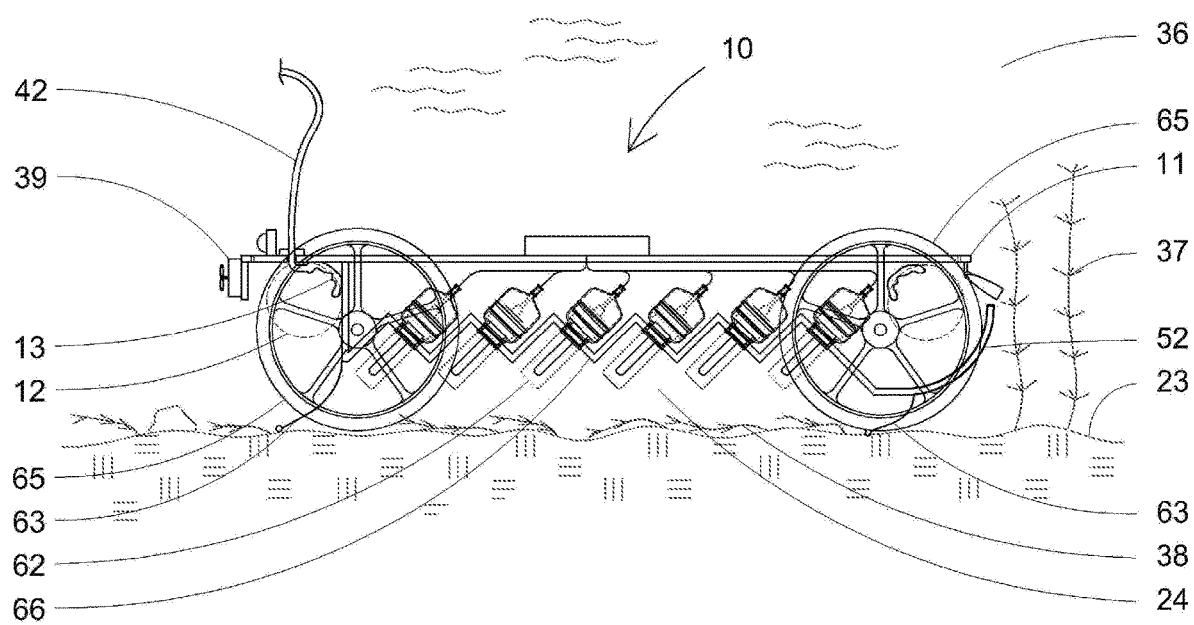
FIG. 23 is a schematic elevation view of a variation of the remote-controlled chamber propelled by powered wheels for chamber movement along the floor to treat submerged aquatic plants. UV-C lights are used to treat the consolidated aquatic plants within the containment volume.

Another variation of this remote controlled floatation chamber invention is the use of UV-C ultraviolet light waves alone or in combination with herbicides or other additives within the containment volume to treat submersed and surface aquatic species as shown in FIG. 21, FIG. 22, and FIG. 23.

The chamber in the preferred embodiment has a rigid or semi-rigid top surface and an open lower extremity. The top surface may also, for example, be flexible with a rigid portion such as a sheet of ½" thick HDPE for attaching various devices. A perimeter skirt with a weighted lower extremity forms the flexible containment walls of the chamber. When the perimeter floatation ribs or tubes are inflated the top surface of the chamber may be above the water surface. A tow rope or a small propulsion system that is remote controlled is used is used in some embodiments to maneuver the chamber to any desired location over an infestation of aquatic plants.

When the floatation ribs or tubes are deflated the chamber sinks over a milfoil site and deflects the tall flimsy plants downward. When the chamber comes to rest on the floor, the perimeter skirt forms a seal with the floor thereby forming a containment volume or chamber with densely packed milfoil plants. The isolated containment chamber volume is a small fraction of the full height water column volume above the chamber. If the water depth is 10' and the containment chamber height is 2" that is only 1.67% of the full height that needs to be treated. This allows for activating a small dose of herbicide into the containment chamber to treat the milfoil. Provisions for reuse or filtering of the herbicide can then occur. In many embodiments of the present invention the chamber height may be less than 2".

Once the floatation tubes or ribs on the chamber are deflated the chamber sinks over the treatment area. The fixed support pads and the weighted flexible skirt around the perimeter of the chamber form a containment volume over the aquatic milfoil plants. A rigid support frame at the skirt attachment to the chamber perimeter keeps the height of the chamber approximately 1" to 2" above the floor. The preferred embodiment of the invention includes an herbicide mixes storage bladder that is located under the top surface of the chamber. This provides a means of displacing the water in the containment volume with the storage bladder containing the proper herbicide concentration mix. When the storage bladder is full of herbicide mix, it will press against the plants and occupy most of the volume within the containment volume when at rest on the floor.

The herbicide mix is then pumped out of the storage bladder with the discharge pump and into the containment volume to treat the plants. Since the volume of the herbicide mix equals the volume of the containment volume, virtually no open water enters the containment volume during treatment. After the treatment exposure time is complete, a fill pump is used to transfer the herbicide mix water in the containment volume back into the storage bladder for reuse. Ideally with perfect displacement back and forth of the herbicide mix between the containment volume and the storage bladder, most of the herbicide is reused multiple times at other treatment areas. However, leakage of water in and out of the containment volume will occur so a small amount of herbicide will need to be dosed or added to maintain the proper herbicide concentration for treatment.

At the end of the day after multiple milfoil sites have been treated the chamber can be returned to base, dock or boat. In this context, the term "boat" includes a barge or any floating object having sufficient buoyancy to support the required apparatus. In some embodiments of the invention the object may itself be remotely operated whereby both the object and the chamber are remotely controlled. The remaining herbicide mix in the storage bladder can then be pumped through an activated carbon filter with the Filter Pump thereby resulting in a very small amount of herbicide from entering the open water after multiple treatments.

By only treating the milfoil plants in the isolated containment volume the herbicide concentration only occurs within the small water volume in the containment volume for fast and effective treatment of the milfoil. This minimizes the overall use of herbicide to a small fraction of open water treatment methods. The herbicide acts quickly to damage the cell tissue of the densely positioned milfoil plants. Those skilled in the art will recognize that milfoil plants naturally grow multiple plants closely spaced together and thus densely disposed or positioned.

Once the treatment exposure time is completed, and that may only be a few minutes to hours, depending on the type and concentration of the herbicide used, plant type, temperature and other factors, the treatment water is pumped out of the containment volume and back into the storage bladder or through an activated carbon filter to remove the herbicide. The cleaned and treated water is then discharged into the open water. The small fraction of herbicide used may be less than 1% of prior art methods. The preferred embodiment of the invention includes a storage bladder that allows for water displacement and reuse of the herbicide.

After treatment is completed the floatation ribs or tubes on the chamber are remotely inflated and the chamber apparatus floats to the surface. As an option, the herbicide mix in the storage bladder is pumped to a storage vessel on the boat or dock for future storage, treatment and or disposal. This above method may result in a reduction of well over 99% of herbicide use. The chamber with a bladder treats multiple sites in one day in some embodiments. The overall cost of milfoil treatment with this method will be a small fraction of prior art methods. Subsequent treatment later can be made with a different herbicide to minimize the chance of the milfoil developing a resistance to the herbicides. It is best to treat the plants when they are young.

Figure 19:
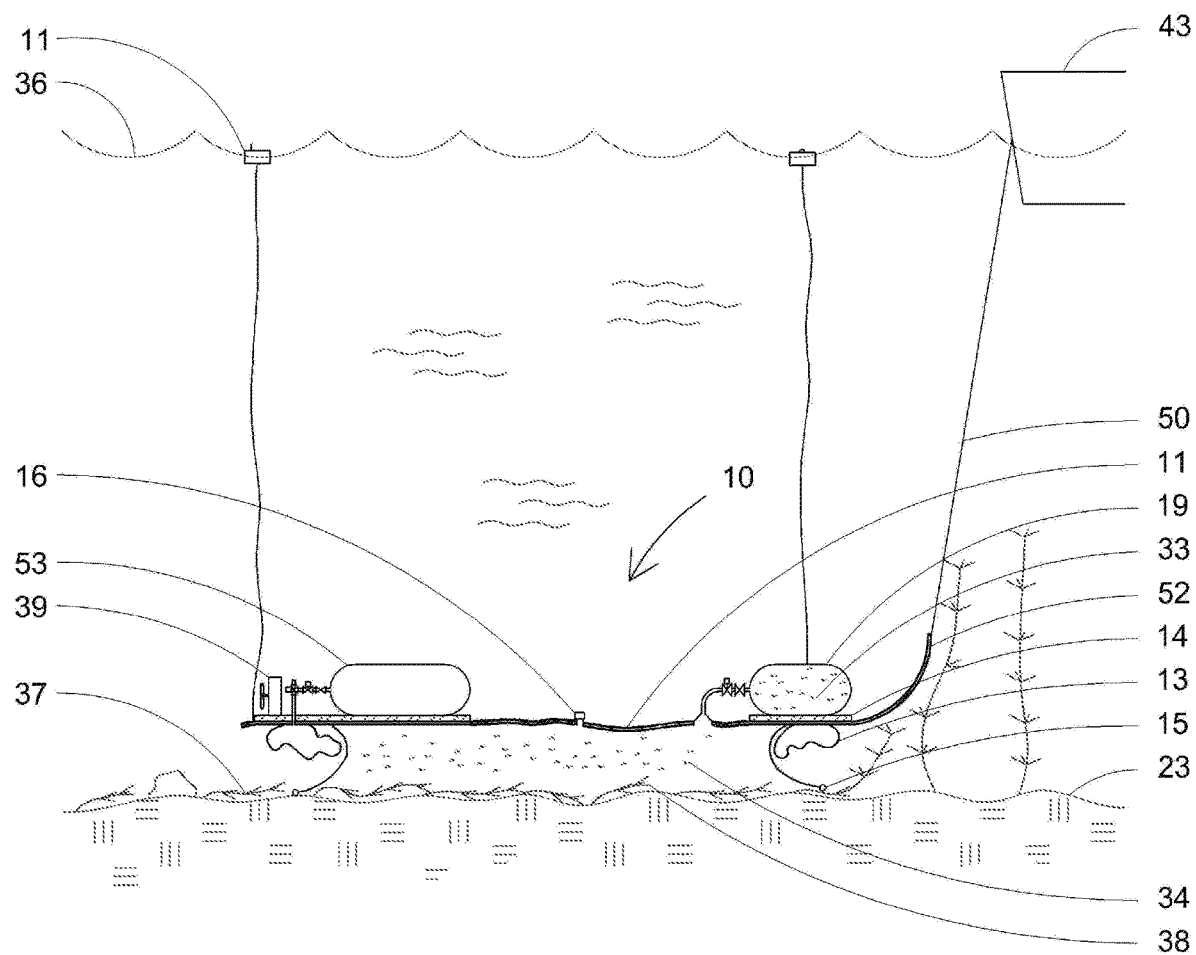
FIG. 19 is a schematic elevation view of a variation of the remote-controlled chamber with an herbicide dosing cylinder and a compressed air cylinder with remote operated fill and air release valves.

In a variation of the chamber invention, as shown in FIG. 9 through FIG. 18, the chamber is fitted with an herbicide cylinder, discharge pump and a filter. No bladder, fill pump or discharge pump are used. This variation still reduced the herbicide use but not quite as much as the chamber with a storage bladder. The advantage of this variation is the simplicity and lower costs. FIG. 19 is another variation that also eliminates the filter pump and filter. All these variations substantially reduce the amount of herbicide use and the selection of each variation depends on many factors including specific application, degree of infestation, location, operator experience, costs and other factors.

In a variation of the invention a large semi-flexible chamber with floatation tubes in the form of a large flexible sheet with a rigid portion to hold certain components can be provided. For example, the chamber may be 12' wide by 24' long and have floatation tubes to keep the chamber afloat when the tubes are inflated. Thus, the chamber will sink when the tubes are deflated. The chamber is remote controlled or towed into position in some embodiments. When the chamber is used with microbes, the chamber will remain on the floor for longer periods to give the microbes a better chance of digesting the decaying plants.

For surface aquatic plant treatment, the chamber will remain on the water surface with the containment volume that may be, for example, 8" to 12" high, forming a small volume of space above the aquatic plants portion above the surface of the water as shown in FIG. 20. The herbicide is sprayed into the containment volume where it effectively encounters the plant surfaces above the water. An optional fan may be used to help circulate the herbicide spray in the containment volume.

A preferred embodiment of the Aquatic Plant Floatation Treatment Chamber 10 invention hereinafter referred to as the chamber 11 and includes a remote control module 32 for controlling all operations for the chamber 11 for inflating and deflating the floatation tubes 12, 13 or ribs, operating remotely the pumps 21, 22, 25 and herbicide dosing cylinder 19 and filter 26 along with operating the pumps, area lighting 41, cameras 40 and other items.

The specific remote-controlled items are described more fully as follows:

Remote Control Module 32: This includes operations with different optional variations.

This unit is located on the boat 43 or dock and includes an electric power generator 45, air compressor 46, and vacuum unit 47, controller that is much like the remote controller for drones. It contains a computer 48 that monitors, controls and switches various apparatus for remotely controlling apparatus including:

Control all control valves and switches 27.

Inflating the floatation tubes 12 on the chamber to keep it on the water surface.

Deflating the floatation tubes 13 on the chamber so is sinks to the floor.

Trolling unit 39 for piloting, steering and moving the chamber with remote operation.

Controls for administering a small pre-determined dose of herbicide into the chamber.

Controls for administering a dose of herbicide 34 into the storage bladder 20.

Controls for administrating a dose of herbicide mix 34 into the chamber containment volume 24 to start treatment exposure time cycle for the aquatic plants.

Control for sensors 28 that indicate the concentration of herbicide within the chamber.

Filter Pump 25 for pumping the herbicide mix or after treatment water through the activated carbon filter 26.

Controls for sensors 28 that indicate the concentration of herbicide after the activated carbon filter 26.

Discharge pump 21 for pumping the herbicide mix from the storage bladder into the containment volume.

Fill Pump 22 for pumping the herbicide mix from the containment volume into the storage bladder.

Controls 32 for pumping the herbicide mix in the storage bladder to a boat storage vessel.

Controls 32 for activating area lighting to view the area near and under the chamber.

Controls 32 for activating video cameras to view the area near and under the chamber.

Computer 48 including monitoring screen to view and record plants and terrain near and under the chamber.

Record above and date, time, air and or water 36 temperature.

Remotely activate switches 27 and other devices on the chamber equipment.

Remotely activate compressed air cylinders 53 on a variation of the chamber invention.

Remotely activate herbicide sprayer for treatment of surface aquatic plants.

Remotely activate and control incidental or added items. In some embodiments, the remote-control aspect of the apparatus also controls the location of the remote-control module 32:

Several support items to the invention such as batteries 30, remote control devices, steering, pumps, fans and automatic valves 27 and controls may be off-the shelf items and many variations of each may be utilized.

Umbilical cord 42: An umbilical cord extends between the boat 43 and chamber 11 that contains flexible air tubing or hoses for delivering compressed air and or vacuum, electric power and control wirings for area lights and camera and sensing wire to herbicide concentration sensors, plus pumping operations, and other valves and control devices. A safety cable and or tow rope 50 is also included to retrieve the chamber should the floatation tubes be punctured or other equipment problem.

Floatation Containment Chamber 11: The chamber 11 may for example be built in a modular design that can be joined together to make for a large treatment unit. The preferred chamber module size may be 4' wide by 8' long. The chamber may have a solid, semi-solid or flexible top surface with at least a portion that is ½" thick high-density polyethylene (HDPE) or other durable material to support other items to such as pumps, weights 14 filter, area lights, video cameras and other items. The perimeter skirt of the chamber may have a 2" high angle where it connects to the chamber top surface, so it forms a 4'×8' by 2" high inverted chamber volume that is called the containment volume 24. Once the containment volume 24 is on the floor 23 it will occupy a volume of 5.33 cubic feet or 40 gallons. The selection of 2" height is for example purposes only and the bladder height may be best determined by the floor 23 terrain and milfoil 38 plant densities. The top of the chamber 11 may have one-way vent 16 ports that allow for any trapped air within the containment volume 24 to escape.

Floatation tubes 12, 13 or ribs: The chamber perimeter has inflatable floatation tubes or ribs for buoyancy. These tubes may be 8" diameter when inflated. Allowing an overall perimeter length of 20' the buoyant force will be over 400 pounds. The tubes are remotely inflated and deflated by the remote-Control Module Unit 32 with compressed air or vacuum. The floatation tubes 12, 13 may be in two separate systems in case one system should be torn or damaged. Each floatation tube system is sized to ensure that it has sufficient buoyant force to lift the weighed chamber 11 to the water 36 surface should the other floatation tube fail for any reason. When the floatation tubes are inflated the chamber and all attached components will float to the surface of the water 36. When the floatation tubes are deflated, the weighed chamber will sink to the floor 23. The material of fabrication may be vinyl covered nylon fabric or other durable puncture resistant material that is UV resistant.

Weights 14 can be added, steel plates or pipes that attach to the top of the chamber that add weight and help cause it to sink and help deform and concentrate the flimsy milfoil 37 plants against the floor 23 when the floatation tubes 13 are deflated. The weights 14 may also form part of the top surface of the chamber.

The top surface or ceiling of the chamber 11 which may be, for example, be may be a sheet of ½" thick HDPE, may also be, for example, be solid, semi-solid or flexible with a solid support section such as the HDPE weight 14 to fasten or hold a number of support items including pumps, herbicide cylinder with dose dispensing device, activated carbon filter, herbicide transfer pumps, area lighting, video cameras, vibrators, and markers that are attached by cord to each corner of the chamber that float to the surface to indicate where the chamber is.

Skirt: The perimeter of the chamber has a flexible rubber or plastic skirt 6" to 12" wide with a 1" to 2" rigid portion where it connects to the chamber top surface and weighted lower extremity that in some embodiments is a chain within a hem on the lower extremity of the flexible skirt. This allow the skirt to form a seal on the irregular floor 23 surface. The seal may not be watertight but should be substantially tight to minimize open water movement into the containment volume.

Floatation position markers: The floating position markers 31 may have LED flashing lights with a fluorescent color. The markers may also have an antenna 29 attached for receiving signals 51 from the remote-control module 32 to activate the various control devices 27.

Herbicide storage bladder: The bladder 20 may be attached to the underside of the chamber 11 top surface and occupy most of the containment volume 24 volume when full of herbicide mix 34 as shown on FIG. 1 through FIG. 8. For illustrative purposes, without any intent to constrain the size of the chamber 11 in all embodiments, a chamber 11 that measures 4'×8'×2" height chamber 11 will be used to illustrate certain features. The nominal size of the bladder 20 may be slightly less than the volume of the containment volume and fit within containment volume 24. This can allow for a displacement volume of close to 40 gallons of herbicide mix or water. The material of fabrication may be vinyl covered nylon fabric or other durable puncture resistant material that is UV resistant. Built in ribs in the bladder help maintain the 2" height when full. Fill and empty tubes are attached to the bladder that extend through the top surface of the chamber and connect to the fill pump, discharge pump and Filter Pump on top of the chamber. In a variation of the chamber 11 invention with a flexible top surface the storage bladder 20 and floatation tubes 13 may be formed as an integral part of the flexible top surface chamber material.

The storage bladder 20 is filled with an appropriate herbicide mix 34 when the chamber 11 is first launched. When the chamber 11 sinks to the floor 23 and covers the milfoil 38 it presses the delicate plants against the floor 23. The chamber under ideal conditions rests on a flat floor over the plants where the bladder displaces most of the open water that was under the chamber. Then to start the treatment mode the discharge pump 21 will pump the herbicide mix 34 out of the storage bladder 20 and into the containment volume 24 of the chamber 11. If the perimeter skirt 15 forms a tight seal the herbicide mix 34 will fill the containment volume 24 of the chamber 11 as the volume of the storage bladder 20 decreased from full to empty. The better the seal the less open water 36 will mix and dilute the herbicide mix 34. The storage bladder 20 chamber 11 methods facilitate providing a predetermined concentration of herbicide mix 34 to treat the contained milfoil 38 plants in the containment volume 24. Unlike open water herbicide treatment methods where the concentration varies widely even with tremendous amounts of herbicide 33 being used, the chamber 11 method allows for fast and accurate herbicide mix 34 concentration control with fast and efficient treatment of the milfoil 37 plants. The treatment time with this close control will in some cases be only a few minutes to introduce sufficient herbicide on and into the milfoil plants tissue to cause them to die. Even though the milfoil 37 plants may have received a lethal dose of herbicide it may take a few days or weeks for them to show the signs of dying, especially in cold water. After the milfoil plant exposure treatment time is completed the fill pump 22 will draw the herbicide mix 34 waters out of the containment volume 24 and pump it back into the storage bladder 20. It should be noted that as the storage bladder 20 is filled or emptied while the chamber is at rest on the floor, no open water should enter the containment volume. However, assuming a 10% to 20% average loss or dilution of herbicide mix 34 during and after treatment, a dose of concentrated herbicide 33 is dispensed back into the storage bladder 20 to maintain the proper concentration. This is controlled by sensors 28 that measure certain parameters relating the herbicide mix 34 concentrations in some embodiments. The chamber 11 can then be raised and or moved to an adjacent or remote treatment area 54 where the treatment process can be repeated. The entire treatment cycle from setting the chamber 11 on the floor 23 to moving it to an adjacent treatment area 54 site may only take 20 to 30 minutes. The chamber 11 may also be slowly towed over an infested milfoil site for continuous flow treatment. This cycle of moving the chamber 11 and treating multiple treatment area 54 sites can continue. When all treatment area 54 sites are completed, or when desired, the Filter Pump 25 can be energized to pump the herbicide mix 34 from the storage bladder 20 through an activated carbon filter 26 that is designed to capture and filter out the herbicide 33. This allows for the discharge water from the system to be virtually herbicide free or greatly reduced. A sensor 28 measures the concentration of herbicide exiting the filter in some embodiments.

The storage bladder 20 may be a vinyl coated nylon material that is biased when full to be 2" thick by the length and width that may be, for example, within 4'8' for example. In this case the containment volume 24 volume will be 5.33 cubic feet or 40 gallons. Partial ribs or deformations on the bladder surface allow for flow to occur between the top surface of the chamber 11 and the top of the storage bladder 20. Fill and empty tubes on the bladder extend through the top surface of the chamber 11 to the various pumps. The fill pump and discharge pump are electrically operated in some embodiments and be high flow low and pressure type, for example 10 gallons per minute at 10' head. Accordingly, filling or empty the bladder can occur in 4 minutes. The filter pump preferably has a higher output pressure and lower flow pump that may be, for example, 4 gpm at 60' head to accommodate the filter 26 pressure drop. This will filter the 40 gallons of herbicide mix 34 water in 10 minutes. The above example is based on 2" of bladder height. If this height were 1" the volume will be 20 gallons and filtering time will be 5 minutes. In practice, it is desired to keep the containment volume 24 volume to a minimum and that will depend on floor terrain, size, type and density of plants and other factors.

One variation of the chamber 11 invention excludes the storage bladder 20 and transfer pumps as shown on FIG. 9 through FIG. 17. In areas where herbicide 33 use is more acceptable this variation will substantially reduce the amount of herbicide 33 used to treat aquatic milfoil plants 37 but not as much as with the storage bladder 20 method. This bladder free containment volume 24 method will be less expensive and less complicated to operate.

This embodiment of the chamber 11 invention allows for the herbicide 33 to be mixed directly into the containment volume 24 of the chamber for treatment when the chamber 11 is on the floor 23. An herbicide cylinder 19 with a dose dispensing mechanism is used at each treatment area site. Once the chamber 11 is in place over a milfoil plant 38 area to be treated a small dose of herbicide 33 is injected into the containment volume 24 that may be 40 gallons of volume. At 100 ppm herbicide concentration, the dose will be less than 1 ounce per 40 gallons. Typically, 6 to 12 sites or more will be treated in one 8-hour day. After the milfoil treatment exposure time with herbicide mix 34 is completed in the containment volume the treated water with herbicide is pumped by the Filter Pump 25 into and through an activated carbon filter 26 that reduces the herbicide concentration to a fraction of the starting concentration. It is estimated that the overall herbicide volume that enters the waterway with this invention may be less than 1% of prior art herbicide treatment methods.

An alternative embodiment of the chamber 11 excludes the storage bladder 20, pumps 21, 22, 25 and filter 26 as shown on FIG. 19. In areas where herbicide 33 use is much more acceptable this variation will still substantially reduce the amount of herbicide 33 used to treat aquatic milfoil plants 37 than prior treatment methods. Embodiments of this type utilize a much larger flexible chamber resulting in apparatus and a method that has less operating costs and it is less complicated to operate.

The chamber 11 method may also be used for control of surface aquatic plants 55 as shown in FIG. 20. Prior art surface sprays of herbicide 33 use low pressure and large orifices in the spray nozzles to generate large droplet sprays 57. This is to prevent or minimize drift of the spray 57 that may extend for long distances and cause herbicide 33 to land where it is not wanted. This chamber 11 method with its containment volume 24 allows for the use of higher spray pressures and smaller orifices in nozzles that can produce very fine spray droplets or a mist and no herbicide 33 drift outside of the containment volume 24. All the spray 57 is contained and not exposed to ambient air. The finer the spray 57 the greater the herbicide 33 coverage on the plant 55 surfaces and that insures more efficient plant treatment. In this variation an herbicide sprayer 56 dispenses a fine spray 57 or mist of herbicide 33 directly into the containment volume 24. An optional circulating fan 58 and ductwork 59 can also be used to enhance the contact between the plant 55 surfaces and the fine herbicide spray 57 as shown dashed in FIG. 20. The circulating fan 58 circulates the airborne herbicide spray 57 or mist through the ductwork 59 and into the containment volume 24 where a diffuser plate 60 is used to more evenly distribute the airborne herbicide spray 57 over the surface of the aquatic plants 55. A screen 61 prevents plants 55 and plant fragments from blocking the inlet to the optional circulating fan 58. Re-circulating the spray 57 over and over helps keep the spray 57 airborne and helps obtain through spray coverage for all the plant 55 surfaces above the water 36.

All the above variations of this invention employ a chamber 11 with a containment volume 24 where controlled herbicide treatment of aquatic milfoil plants 37 can efficiently be provided. The variation selected will most likely be based on the degree of opposition to herbicide 33 use. Certain pristine lakes that supply drinking water may have very strong opposition to the use of any herbicide 33 use but may consider the chamber invention 10 with bladder 20 and filter 26. Where lakes serve mainly recreational and agricultural use the chamber invention with only the filter 26 feature may be more acceptable. Where herbicide 33 use at certain lakes is readily acceptable and where cost is a major concern, the chamber method with herbicide dose dispensing cylinder 19 may be the preferred choice. All these chamber 11 treatment variations are included in this treatment chamber invention 10.

UV-C Chamber Method: The chamber 11 method with UV-C 62 light wave treatment can be used on submersed or surface aquatic plants 38. The remote-controlled floatation chamber 11 can be directed to a site by the trolling unit 39. For submersed plants 37 the floatation tubes 13 will be deflated so the chamber 11 sinks to the floor 23, forming a containment volume 24 over the aquatic plants 38 to be treated. Support posts 64 under the chamber maintain a certain selected height of the containment volume 24. For surface aquatic plants 37 the containment volume 24 is the space between the water surface 36 and the top surface of the chamber 11. The height of the containment volume 24 is determined by the height of the floatation tubes 12 above the surface of the water 36 and the top surface of the chamber 11. The UV-C 62 lights are remotely activated and remain "on" for the exposure period that may be 5 to 10 minutes or more. A perimeter light shield 63 stops stray UV-C 62 light from escaping the containment volume 24. In some applications, the use of UV-C 62 lights and herbicides 33 may be used together to treat aquatic species 37.

Buoyancy: The treatment chamber 11 in a 4'×8' size for example may only weight 50 pounds but once fitted in the field with all the attachments and weights it may reach 200 pounds. The buoyant force of two sets of floatation tubes 13 may have a buoyant force of 300 pounds each for a total of 600 pounds lifting force. This standby and excess buoyant force helps insure that the chamber 11 will float to the surface when the tubes 13 are fully inflated even with some milfoil plants 37 or sediment that may drape on or cover the chamber 11 and even if one section of the floatation tubes 13 are damaged.

This chamber invention 10 solves most of the problems associated with prior art herbicide 33 treatment application methods that can cause numerous health, safety and largely unknown environmental problems along with high costs. This Remote Operated Milfoil Treatment Floatation Containment Chamber invention 10 can automatically treat densely packed milfoil plants 38 within the containment volume 24 quickly and efficiently. This chamber method reduces the milfoil treatment volume to the containment volume 24 and not the volume of the nearby entire open water 36 area. This proximity treatment method of milfoil should result in a reduction of approximately 99% of herbicide 33 use over prior art application methods.

There are a few herbicides 33 that are used in open water applications to treat aquatic plants including milfoil 37. These include herbicides, such as Imazamox®, Harvester® Liquid, Fluridone® Liquid, Clearcast® and many others. DMA 4IVM contains the active ingredients Dimethylamine® salt of 2,4-D and the label shows excellent control of Eurasian Water Milfoil. The label shows it safe for drinking water when the concentration is less than 70 ppb. Since virtually all herbicide labels show recommendation concentration of use in open waters, a much higher herbicide mix concentration within the containment volume 24 should greatly speed up the treatment control of the plants 38 within the containment volume. Some herbicides are effective at concentrations of 100 to 200 ppm (parts per million) and some are rated in ppb (parts per billion). Manufactures list restrictions and terms of use when added to open water 36. Some have a very short half-life and new herbicides are being introduced that appear to be much safer to use even in lakes that provide water for drinking.

A description of the Environmental Protection Agency filtration recommendations is published on the World Wide Web by Pure Water Products, LLC of Denton Tex. at http://www.purewaterproducts.com/articles/carbon. The EPA's pesticides category lists 14 familiar poisons such as Aldicarb, Chlordane, Heptachlor, and Lindane. In all 14 cases, activated carbon is the only recommended filtration treatment. Of the 12 herbicides listed (2,4-D, Atrazine, etc.), activated carbon is the only filter treatment recommended. For Organics, Pesticides, and herbicides, the standard treatment, and in most cases the recommended treatment is activated carbon. An activated carbon filter is ordinarily used in the apparatus and method of the present invention although other medias and additives may be used or in combination with activated carbon.

Imazamox® herbicide 33 at a concentration of 100 ppm was selected for use in evaluating the method and apparatus of the present invention because that herbicide can be removed or filtered with the activated carbon filter 26 that is part of this invention 10. A few other approved herbicides may be used where allowed and with various concentrations and treatment times. All the herbicides labels list concentrations based on type of aquatic weeds in open water where the herbicide is diluted fast. This chamber 11 method can use most of these herbicides but may use a much higher concentration for a shorter exposure time to effectively treat the milfoil plants 38. Some of the listed herbicides show concentrations of 50 to 150 ppm and some in ppb. If these rates were doubled, less than one ounce or herbicide 33 will be used in the 40-gallon containment volume. Then with the reuse by the bladder 20 feature and the activated carbon filter 26 the amount of herbicide 33 that will remain in the open water 36 is negligible compared to any prior art herbicide application method.

Example of prior art method to a chamber 11 method use on submerged plants with an 8'×16' treatment area 54: This compares the amount of herbicide that may be used for treatment as compared to this invention. The treatment area is 8'×16'. This is the area for four (4) 4'×8' chambers 11 connected.

Calculation Prior art herbicide method:

Submerged plants are treated by underwater hose distribution of herbicide that allows for the herbicide to mix with the full height of water from floor to the surface as it becomes fully diluted. Even though the prior use of herbicide is used to treat large open areas and cannot be restrained within the treatment area the use of only the treatment area for general example areas to demonstrate the dramatic difference in the amount of herbicide needed between prior art and the chamber method. In this example, there is an 8'×16' area that is 10' deep that is to be treated with herbicide.

This prior art method needs to treat a minimum of the 8'×16'×10' deep×7.5 gallons per CF=9,600 gallons of water 36. This volume of water should have an average herbicide concentration of 100 ppm. This will require the use of 9,600 gallons×100 ppm/1,000,000 ppm=0.96 gallon or 123 ounces of herbicide 33. This is a very rough relative estimate and may vary widely but may be reasonable for comparison purposes.

Calculation Chamber Method:

The volume of water in the 2" high containment volume that needs to be treated is a fraction of that required by prior art methods and apparatus. In one embodiment of the present invention an 8'×16' chamber is lowered to 2" above floor covering the milfoil. That is 8'×16'×2"/(12"/ft)=21.3 cubic feet that corresponds to 160 gallons within the containment volume 24. At 100 ppm: The concentration will be 160 gallons×100 ppm 1,000,000 ppm=0.016 gallons=2 ounces herbicide 33.

Comparison of the above treatment methods is a comparison of 2 ounces versus 123 ounces or 1.6% of prior art herbicide needed. In this case, prior art allows 123 ounces of herbicide 33 to remain in the body of water. By comparison, this invention only allows 2 ounces to remain in the water. However, by using the storage bladder 20 feature and or the activated carbon filter 26 the actual amount of herbicide 33 that remains in the body of water may be less than 1% a negligible. It should be noted that the herbicide treatment method for surface aquatic plants as shown in FIG. 20 will not significantly reduce the amount of herbicide use. However, the method of the present invention does reduce the loss and drift of herbicide spray away from the treatment area.

Reducing the amount of herbicide needed to treat aquatic weeds by 50% is a substantial improvement over the prior art. Reducing the amount of herbicide to 10% or less it is a major improvement over the prior art. The chamber treatment method in accordance with the present invention uses a negligible amount of herbicide and furthermore allows geographic areas that do not presently allow herbicide use to consider the method of treatment in accordance with the present invention.

Some embodiments of the present invention utilize filtration of containment volume herbicide mix after treatment. In such embodiments once the milfoil treatment exposure time is completed, and that depends on the time and concentration, for example 100 ppm, of the herbicide used, the 160 gallons of herbicide mix 34 in the containment volume 24 is pumped through an activated carbon filter 26. The filtered herbicide mix 35 leaving the filter should have a very low concentration of herbicide as it is discharged into the open water. The chamber water may also recycle several times through the activated carbon filter to reduce the herbicide to an even lower concentration. When filtering is complete the remaining herbicide 33 in the water may be far less than 1% of what would be used with the prior art approach. Even without any filtration, the amount of herbicide 33 remaining in the water from this chamber method may be less than 2% of what would have been used with the prior art approach.

The overall size of one chamber 11 may be 4'×8', or 32 square feet and may utilize a rigid sheet of ½" HPDE. This modular size may be practical due to weight and ease of handling for areas that may have small amounts of aquatic plants found near marinas. However, any size chamber may be used. Large chambers may be made of a lightweight flexible fabric with reinforcing ribs that may also be the floatation tubes when inflated. Rigid sheets that act as weights and supports for connecting items to can be added. The chamber in some embodiments is fitted with edge connectors that allow for any number of chambers to be quickly attached together at the water treatment site. The collective size of, for example, 12 such chambers, where each chamber is 4'×8', tied together covers a 12'×32' area, or 384 square feet. Thus, the utilization of a plurality of such chambers results in an apparatus and method that is scalable from a very small to almost any large size. Each chamber in some embodiments are constructed whereby the entire chamber may be rolled up in a cylindrical roll for transport and unrolled at a work site. The floatation tubes may be formed as part of the chamber top surface and when inflated give it a rigid shape on the surface of the water. The size may be 20' wide by 80' long or any other desired size. Weights made of HDPE sheets can then be added to provide weight and a rigid surface for securing items to.

Sequence of Operation for a Preferred Embodiment of the Invention

The Remote Operated Milfoil Treatment Floatation Chamber 10 is delivered to a boat 43 dock, beach or site for launching and treatment of aquatic milfoil plants 37. A Remote-Control Module Assembly 32, 48 located on the boat 43 is used for all control and operation of all the components including electric power generator 45, air compressor 46, vacuum pump 47, computer, monitor, controls panel and recorders 48, some with wireless technology devices. The floatation tubes 12 are inflated prior to placing the chamber 11 in the water.

Support items can be provided on a rigid attachment 18 portion on top of the chamber 11 and may include pumps, filters, cylinders, and other items. Weights 14 can be added to allow the chamber 11 to sink when the floatation tubes 13 are deflated. The storage bladder 20 is filled with herbicide mix 34 prior to launching the chamber 11 to the treatment site 54.

The control module 32 activates a remote-controlled trolling unit 39 and directs the chamber 11 to the selected treatment site 54. Once the chamber 11 is over the selected treatment site 54 the control module 32 can deflate the floatation tubes 13. The chamber 11 will then sink over the treatment area 54 and cover the aquatic plants 37 in the containment volume 24. A perimeter skirt 15 helps form a seal with the floor 23 to minimize and transfer of water 36 or herbicide mix 34 in or out of the containment volume 24. The deflected aquatic milfoil plants 37 are pressed against the floor 23 by the underside of the storage bladder 20. The control module 32 can then active the discharge pump 21 that pumps the herbicide mix 34 out of the storage bladder 20 and into the containment volume 24. As the displacement storage bladder 20 is emptied virtually no water 36 enters or leaves the containment volume 24. This helps to insure that very little loss of herbicide mix 34 occurs. This is the point where herbicide mix 34 treatment occurs. The treatment exposure time may vary depending on many factors but may be 5 to 10 minutes or more. After the treatment exposure time the remote-control module 32 can activate the Fill pump 22. This will pump the herbicide mix 34 in the containment volume 24 back into the storage bladder 20 for future use. The control module can then active and inflate the floatation tubes 12 that cause the chamber 11 to rise to the water 36 surface. With the area lights 41 and remote operated video cameras 40 the operator can control the chamber 11 position to partial height in the water 36 or to the surface by use of the remote-controlled trolling unit 39 and floatation tubes 12, 13. In many cases the chamber 11 may be directed in a grid pattern over a large infestation of milfoil plants 37. In this case the chamber 11 may only be lifted a short height and repositioned over the milfoil 37 until the entire treatment area 54 has been treated. On each corner of the chamber 11 floatation position markers 31 attach to the chamber with nylon rope. The flotation markers float to the surface. The markers show on the surface of the water 36 where the chamber 11 is located underwater.

The treatment chamber 11 method in another variation may replace prior art barrier mats that are labor intensive and remain on the floor for months. For application where it is not desired to allow the decaying plants to reintroduce their 24 contained nutrients back into the water, microbes can be used within the containment volume after treatment. The chamber with a dose dispensing cylinder of microbes setting on the covered infested plants may first kill the plants by herbicide, chemical or non-chemical means. Then the dispensing cylinder can introduce microbes, bacteria and or enzymes into the chamber that will digest the decaying plants, including phosphorus, ammonia and nitrates. Microbes digest and break down the decaying organic matter into harmless water and carbon dioxide. This is a much slower process than herbicide use alone but may be preferred in certain applications. See FIG. 19 for this variation. One biological treatment product for example is NT-MAX Biological Digester Treatment.

Several compressed air cylinders may be attached to the top of chamber. Each cylinder may hold over 100 standard cubic feet of compressed air. Each compressed air cylinder is fitted with a manual shut-off valve, air pressure regulated and an automatic open or close control valve. These are used to inflate the floatation tubes or other air operated items.

Batteries: The use of totally submersible batteries such as the Bluefin 1.5 kWh Subsea Batteries that are rechargeable lithium-polymer type can be used for electric power to the transfer pumps, trolling unit, lighting and other devices.

The fill pump and discharge pump are a high flow rate, low head submersible pumps.

The battery is sized to power a trolling unit that moves the chamber to any desired location. The remote controls, power and steering system will be much like a prior art model boat described at http://www.myrctopia.com/sbme/

Known herbicide utilization information includes the use of a Harvester® Landscape & Aquatic Herbicide liquid for floating and marginal weeds as well as for submersed weeds. Submersed weeds, for example are treated by applying the herbicide in water at a rate of 0.5-2.0 gallons per surface acre (per 4-foot water depth). For severe weed infestations, the 2.0 gallon per surface acre rate is utilized and the application is repeated as necessary at 14-21-day intervals. A chart describing a plurality respective herbicides in the limitations on use of such herbicides with respect to human, animal and irrigation applications appears at: http://cdn.shopify.com/s/files/1/0206/8486/t/2/assets/WUR2015.pdf.

The US Environmental Protection Agency website https://www.epa.gov/pesticide-science-and-assessing-pesticide-risks/finalization-guidance-incorporation-water-treatment describes the use of activated carbon for removal of herbicides from water. The EPA's Pesticides category lists 14 familiar poisons such as Aldicarb®, Chlordane®, Heptachlor®, and Lindane®. In all 14 cases, activated carbon is the only recommended treatment. Of the 12 herbicides listed (2,4-D, Atrazine, etc.), activated carbon is the only treatment recommended. For Organics, Pesticides, and herbicides, the standard treatment, and in most cases the only treatment recommended, is activated carbon. Other filtration media is used in other embodiments.

REFERENCE NUMERAL LISTING

10. Invention. Remote Operated Aquatic Plant Treatment Floatation Containment Chamber (Chamber).

11. Chamber: This is also referred to as the invention or top surface of the containment volume.

12. Floatation tubes or ribs inflated. These are used to raise the chamber when inflated.

13. Floatation tubes or ribs deflated. These are used to sink the chamber when deflated.

14. Weights. These may be HDPE sheets or steel plates or pipes that add weight to the chamber to help make it will sink when the tubes are deflated. The HDPE sheets may be ½" to ¾" thick. In addition to adding weight, they may also form part of the chamber top surface portion. These flat plastic plates on top of chamber can also act as a support platform for attaching items to.

15. Skirt. This is the pliable rubber, plastic or fabric on the outer perimeter of the chamber that helps form a seal between the chamber top surface and the irregular floor surface to isolate the water and plants within the containment volume of the chamber. The skirt has a chain like weight at the lower extremity to help form a seal between the irregular floor and the lower extremity of the skirt to form a containment volume. The frame of the skirt will in some embodiments provide a 1" to 2" height that helps insure a minimum design volume of the containment volume.

16. Vents. These are one-way flap type vents on top of the chamber that relieve any air trapped in the containment volume.

17. Grommets. These are located on the perimeter of the chamber and are used to attach guide or tow lines, markers and for joining multiple chambers together to form a large chamber.

18. Attachments. These are connection devices such as straps, fasteners or clamps on top of chamber for securing pumps, cylinders, filters, batteries and other items.

19. Herbicide cylinder. This stores the concentrated herbicide on top of the chamber. The cylinder includes shut off valve, remote control valve, pressure regulator and dose dispenser. It is remotely activated to provide a pre-determined dose of concentrated herbicide into a storage bladder or the chamber area. Although the present description refers to a "herbicide cylinder" It will be understood that other embodiments may instead dispense a pesticide, chemical, microbes or other selected additive.

20. Storage bladder. This is used to hold the herbicide mix. It includes connection hoses or tubes to pumps and filter. It will hold approximately the same volume as the containment volume. The herbicide mix can then be transferred into the containment volume and back into the storage bladder in a displacement manner, so no fluid enters or leaves the containment volume to the surrounding water. The pumps and other items are remotely controlled.

21. Discharge pump: This pumps herbicide mix out of the storage bladder: This is used to transfer herbicide mix from the storage bladder into the containment volume. Sometimes referred to as a transfer pump. Remotely controlled.

22. Fill Pump This pumps herbicide mix from the containment volume into the Storage Bladder: Sometimes referred to as a transfer pump. Remotely controlled.

23. Floor. This is the bottom ground surface area supporting the body of water.

24. Containment volume. This is the space within the perimeter skirt between the chamber top surface and the floor surface when the chamber is on the floor. It contains the densely packed flimsy milfoil plants. Most of the water will be displaced by the storage bladder. The height between the bottom and top surface of the chamber depends of the milfoil density and the floor terrain. The height may be less than 1" to over 4" but 2" is the average height used for estimating purposes. The containment volume may also be above the water to the chamber top surface when aquatic surface plants are treated. In this case the height of the containment volume may be 8" to 12' or more depending on plant height and other conditions.

25. Filter Pump: This pumps the herbicide mix from the storage bladder or containment volume through the activated carbon filter assembly. The pump is remotely controlled.

26. Activated carbon filter. This is used to filter the herbicide from the treated water herbicide mix from the containment volume or storage bladder upon completion of the milfoil treatment and prior to release of the filtered water to the open water.

27. Remote control solenoid valves and switches. These solenoid valves and switches individually serve compressed air and vacuum lines for inflating the floatation tubes, deflating the floatation tubes; controlling flow into and out of storage bladder; controlling the transfer and filtration pumps; and controlling the herbicide dose dispensing or herbicide spray.

28. Sensors: These sense certain parameters relating to the concentration of herbicide in the herbicide mix or before and after the activated carbon filter. The sensors transfer information back to the control panel.

29. Antenna. This may be connected to a floatation marker line and remain partially above the water surface to provide a stronger remote single to the activation devices and equipment on the chamber.

30. Battery: In lieu of delivering electric power from the control assembly on the boat, dock or land a submersible power battery may be provided for pumps, fans, trolling unit, herbicide spray, area lighting and other items.

31. Position markers. A floatation position marker is attached to each corner of the chamber. The bright color marker float, LED light and battery with attachment cord is connected to the chamber. This shows the position of the chamber when deployed underwater and can alert boaters to avoid the area near the chamber.

32. Remote control module. This boat or dock based automatic control module contains all the remote control single devices, much like a drone controller, to activate all the control devices and equipment for inflating and deflating the floatation tubes, a trolling unit for moving and steering the chamber, pumping and transferring herbicide mix, and pumping the used treated water with herbicide to the activated carbon filter. This also controls the area LED lighting and the video cameras. The control module unit includes an electric power generator, transformer, air compressor, vacuum unit, monitor and recorder and other support items.

33. Herbicide. This is concentrated herbicide before being mixed with water. It is stored in the herbicide cylinder or tank.

34. Herbicide mix. This is the herbicide and water mixture at the desired concentration for use in treatment. It is also called treatment water. It may be stored in the storage bladder or placed in the containment volume to treat aquatic plants.

35. Filtered herbicide mix. This is the filtered herbicide mix leaving the activated carbon filter.

36. Water. This is the body of water in the lake, pond or waterway.

37. Milfoil. This term is used to include all aquatic species of plants including Eurasian watermilfoil (*Myriophyllum spicatum*). Although the description uses this term it will be understood that the apparatus and method of the present invention have application to other aquatic plants including surface plants and other species such as invasive Zebra mussels and clams and other Mollusca pests that are subject to treatment and eradication.

38. Milfoil plants under chamber in containment volume subject to herbicide treatment.

39. Trolling unit: This may be a remote controlled underwater trolling motor that has features such as the Aqua-Vu Trolling Motor Camera described at www.aquavu.com. It may also be a jet stream operated unit. It may also be a battery-operated fan powered unit in applications and methods of the present invention used to treat aquatic surface plants.

40. Video camera. This is the remote-controlled camera that may be similar to the Aqua-Vu Trolling Motor camera. See https://www.youtube.com/watch?v=o8PhMbrfaeQ.

41. Area lights. These may be LED lights to illuminate the area near and under the chamber to allow for improved viewing of the aquatic milfoil plants and terrain.

42. Umbilical cord. This includes the compressed air tube, vacuum tube, electrical wires, sensing cables, control wiring and safety cable plus any other line type items between the control module and the remote operated chamber.

43. Boat: This may be the boat, raft, dock or land where the remote-control module is located.

44. Screen. This strains out debris and plant tissue from entering the pump suction.

45. Electric power generator. This is in the boat or on the dock.

46. Air compressor for inflating the floatation tubes. This is in the boat or on the dock.

47. Vacuum unit for deflating floatation tubes. This is in the boat or on the dock.

48. Computer, monitor, control panel and remote controller for all control operations.

49. Winch assembly for umbilical cord and safety cable or tow rope.

50. Tow rope. This may be a rope or cable that is used to help guide and position the chamber or retrieve the chamber if the floatation tubes fail.

51. Single wave between remote control module and the device or item to be activated that may be a trolling unit, pump, fan, filter, valve or activation device on chamber.

52. Deflector. The deflector is a curved form on the leading edge of the chamber and helps deflect the standing milfoil plant downward and into the containment volume as the chamber is towed and moved along the floor.

53. Compressed air cylinder. This is used on a variation of the invention where the chamber is remotely controlled to inflate the floatation tubes.

54. Treatment area. This is an area that has milfoil plants that are to be treated with the chamber herbicide mix treatment method.

55. Surface aquatic plants. These are the aquatic surface plants that have parts of the plant above the water surface as shown in FIG. 20.

56. Herbicide sprayer for use in treating surface aquatic plants. This includes shut off valve, control valve and discharge tube into the containment volume.

57. Airborne herbicide spray. The airborne herbicide spray comes in contact and treats the aquatic surface plants in the containment volume above the surface of the water.

58. Circulating fan. This optional fan, shown dashed in FIG. 20, circulates the herbicide spray through ductwork and into the containment volume and over the surface of the aquatic plants for improved coverage. The herbicide spray may be dispensed directly into the containment volume without the fan.

59. Ductwork. This optional ductwork, shown dashed in FIG. 20, conveys the airborne herbicide spray to and from containment volume to treat surface aquatic plants.

60. Diffuser Plate. This plate or diffuser helps distribute the airborne circulating herbicide spray over the surface aquatic plants in the containment volume. The diffuser plate helps direct the spray pattern in a horizontal direction for improved contact of herbicide spray with the plant surfaces.

61. Screen. This prevents plants and plant fragments from blocking the return flow of airborne herbicide spray from the containment volume into the inlet of the circulating fan when treating surface aquatic plants.

62. UV-C. Ultra Violet Light in the "C" range.

63. Light shield. This shield prevents stray UV-C light waves from escaping from the containment volume.

64. Support post. This post keeps the chamber top surface a fixed minimum distance from the floor that maintains several inches clearance to the UV-C lights.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. A method for controlling mosquito eggs, mosquito larvae, and mosquito pupae which comprises:

identifying a potential location likely to be chosen by a female mosquito for deposit of mosquito eggs;

providing a UV-C germicidal light source;

supporting the UV-C germicidal light source in spaced relation to the potential location;

providing a source of electric power sufficient for operation of the UV-C germicidal light source;

exposing at least one organism selected from the group consisting of mosquito eggs, mosquito larvae, and mosquito pupae to the UV-C germicidal light source.

2. The method as described in claim 1 wherein said step of providing a source of electrical power sufficient for operation of the UV-C germicidal light source is a solar cell.

3. The method as described in claim 2 wherein said step of providing a source of electrical power sufficient for operation of the UV-C germicidal light source of further includes providing apparatus selected from the group consisting of a battery and a capacitor.

4. The method as described in claim 2 wherein the step of supporting the UV-C germicidal light source in spaced relation to the potential location includes supporting the UV-C germicidal light source on a buoyant object.

5. The method as described in claim 4 wherein said step of providing a source of electrical power sufficient for operation of the UV-C germicidal light source is a solar cell.

6. The method as described in claim 4 wherein said step of providing a source of electrical power sufficient for operation of the UV-C germicidal light source of further includes providing apparatus selected from the group consisting of a battery and a capacitor.

7. The method as described in claim 1 wherein said identifying step includes identifying a cistern.

8. The method as described in claim 7 further including the step of providing a flag disposed proximate to the UV-C germicidal light source whereby a visual indication is provided that the UV-C germicidal light source is operational.

9. The method as described in claim 8 wherein said step of providing a source of electrical power sufficient for operation of the UV-C germicidal light source is a solar cell.

10. The method as described in claim 7 wherein said step of providing a source of electrical power sufficient for operation of the UV-C germicidal light source of further includes providing apparatus selected from the group consisting of a battery and a capacitor.

11. The method as described in claim 1 wherein the step of supporting the UV-C germicidal light source in spaced relation to the potential location includes supporting the UV-C germicidal light source on a part of structure constituting a potential location.

12. The method as described in claim 11 wherein said step of providing a source of electrical power sufficient for operation of the UV-C germicidal light source is a solar cell.

13. The method as described in claim 11 wherein said step of providing a source of electrical power sufficient for operation of the UV-C germicidal light source of further includes providing apparatus selected from the group consisting of a battery and a capacitor.

14. The method as described in claim 1 wherein the step of supporting the UV-C germicidal light source in spaced relation to the potential location includes supporting the UV-C germicidal light source on a buoyant object.

15. The method as described in claim 14 wherein said step of providing a source of electrical power sufficient for operation of the UV-C germicidal light source is a solar cell.

16. The method as described in claim 14 wherein said step of providing a source of electrical power sufficient for operation of the UV-C germicidal light source of further includes providing apparatus selected from the group consisting of a battery and a capacitor.

17. The method as described in claim 1 wherein the step of supporting the UV-C germicidal light source in spaced relation to the potential location includes supporting the UV-C germicidal light source on a platform supported by structure engaging surfaces around the potential location.

18. The method as described in claim 17 wherein said step of providing a source of electrical power sufficient for operation of the UV-C germicidal light source is a solar cell.

19. The method as described in claim 17 wherein said step of providing a source of electrical power sufficient for operation of the UV-C germicidal light source of further includes providing apparatus selected from the group consisting of a battery and a capacitor.

20. The method as described in claim 1 wherein the step of supporting the UV-C germicidal light source in spaced relation to the potential location includes supporting the UV-C germicidal light source on a platform supported by a plurality of wheels engaging surfaces around the potential location.

21. The method as described in claim 20 wherein said step of providing a source of electrical power sufficient for operation of the UV-C germicidal light source is a solar cell.

22. The method as described in claim 20 wherein said step of providing a source of electrical power sufficient for operation of the UV-C germicidal light source of further includes providing apparatus selected from the group consisting of a battery and a capacitor.

* * * * *